United States Patent
Yahata et al.

(10) Patent No.: US 11,983,762 B2
(45) Date of Patent: May 14, 2024

(54) INFORMATION PROVIDING METHOD, CONTROL METHOD, COMMUNICATION TERMINAL, AND RECORDING MEDIUM

(71) Applicant: Panasonic Intellectual Property Management Co., Ltd., Osaka (JP)

(72) Inventors: Hiroshi Yahata, Osaka (JP); Takahiro Nishi, Nara (JP); Tadamasa Toma, Osaka (JP); Toshiyasu Sugio, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/051,901

(22) Filed: Nov. 2, 2022

(65) Prior Publication Data
US 2023/0222571 A1    Jul. 13, 2023

Related U.S. Application Data

(63) Continuation of application No. PCT/JP2020/047894, filed on Dec. 22, 2020.

(30) Foreign Application Priority Data

Jun. 11, 2020    (JP) ................. 2020-101866

(51) Int. Cl.
G06Q 30/0601    (2023.01)
G01S 1/04    (2006.01)

(52) U.S. Cl.
CPC ........ *G06Q 30/0641* (2013.01); *G01S 1/0428* (2019.08); *G01S 1/045* (2013.01)

(58) Field of Classification Search
None
See application file for complete search history.

(56) References Cited

U.S. PATENT DOCUMENTS 6,091,956 A * 7/2000 Hollenberg ............ G06Q 30/02
455/566
2013/0317921 A1* 11/2013 Havas .................... G06Q 20/20
705/15

(Continued)

FOREIGN PATENT DOCUMENTS

JP    2017-037574    2/2017
JP    2018-101271    6/2018

(Continued)

OTHER PUBLICATIONS

B. Lopes and R. L. Pereira, "ShopAssist—A unified location-aware system for shopping," 2016 Global Information Infrastructure and Networking Symposium (GIIS), Porto, Portugal, 2016, pp. 1-6, doi: 10.1109/GIIS.2016.7814947 (Year: 2016).*

(Continued)

*Primary Examiner* — Michelle T Kringen
(74) *Attorney, Agent, or Firm* — GREENBLUM & BERNSTEIN, P.L.C.

(57) ABSTRACT

A method includes: acquiring, from a store terminal via a network, limited product information indicating a limited product for which a time available for sale in one branch store corresponding to the store terminal is limited; acquiring, from a communication terminal of a user via the network, i) a request for a purchase menu of affiliated stores and ii) a branch store identifier (ID) specifying one branch store corresponding to a device ID specifying a beacon signal transmitter disposed in the one branch store; generating, based on the limited product information, the request for the purchase menu, and the branch store ID, privileged purchase menu information corresponding to the one branch store; and outputting the privileged purchase menu information to the communication terminal.

5 Claims, 18 Drawing Sheets

(56) References Cited

U.S. PATENT DOCUMENTS

2016/0260296 A1* 9/2016 Shirriff ................ G06Q 10/109
2018/0121961 A1* 5/2018 Villanueva ............. H04N 7/185

FOREIGN PATENT DOCUMENTS

JP       2019-028899       2/2019
WO    WO-2015026863 A1 *  2/2015   ......... G06Q 30/0261

OTHER PUBLICATIONS

International Search Report of PCT application No. PCT/JP2020/047894 dated Mar. 30, 2021.

* cited by examiner

FIG. 4

| DEVICE ID | | | STORE INFORMATION (BUSINESS OPERATOR ID, STORE ID, IN-STORE DETAIL POSITION) |
|---|---|---|---|
| UUID | Major | Minor | |
| 0000-0000-0000-000X | A | 1N | BUSINESS OPERATOR X  STORE A  1F NORTH |
| 0000-0000-0000-000X | A | 1S | BUSINESS OPERATOR X  STORE A  1F SOUTH |
| 0000-0000-0000-000X | A | 2N | BUSINESS OPERATOR X  STORE A  2F NORTH |
| 0000-0000-0000-000X | A | 2S | BUSINESS OPERATOR X  STORE A  2F SOUTH |
| 0000-0000-0000-000X | B | 1G | BUSINESS OPERATOR X  STORE B  1F ENTRANCE |
| : | : | | : |

FIG. 5

| DEVICE ID | | | STORE INFORMATION (BUSINESS OPERATOR ID, STORE ID, IN-STORE DETAIL POSITION) |
|---|---|---|---|
| Frame Type | Namespace ID | Instance ID | |
| 0 | X-A | 1F-ENT | BUSINESS OPERATOR X, STORE A, 1F ENTRANCE |
| 0 | X-A | 1F-RR | BUSINESS OPERATOR X, STORE A, 1F IN FRONT OF RESTROOM |
| 0 | X-A | 2F-BS | BUSINESS OPERATOR X, STORE A, 2F BOOKSHELF |
| 0 | X-A | 2F-KID | BUSINESS OPERATOR X, STORE A, 2F KIDS ROOM |
| 0 | X-B | 1F-ENT | BUSINESS OPERATOR X, STORE B, 1F ENTRANCE |
| ⋮ | ⋮ | ⋮ | ⋮ |

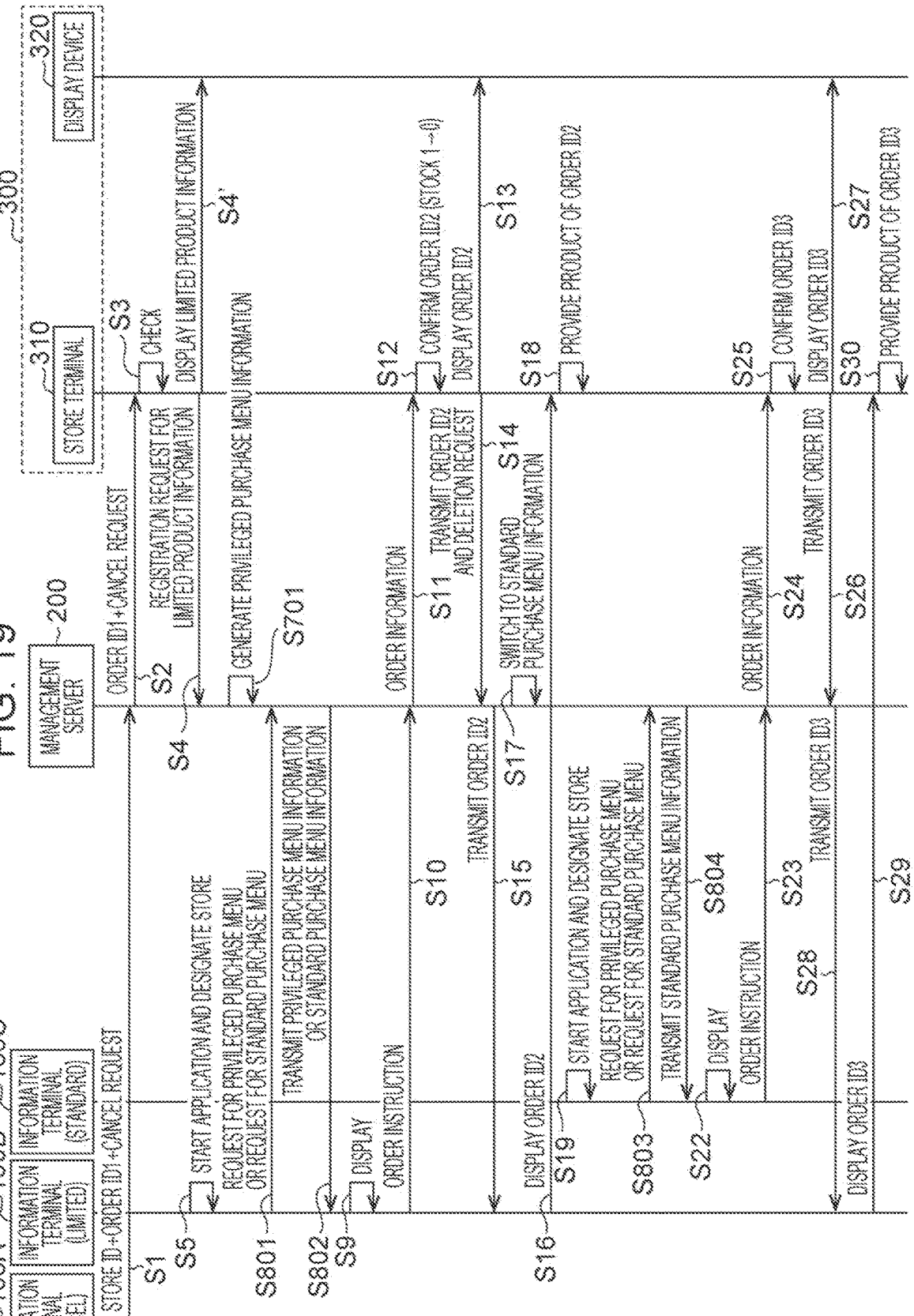

INFORMATION PROVIDING METHOD, CONTROL METHOD, COMMUNICATION TERMINAL, AND RECORDING MEDIUM

BACKGROUND

1. Technical Field

The present disclosure relates to a store management system connected to a store terminal.

2. Description of the Related Art

In recent years, there has been proposed a service for notifying an advertisement from a store to a mobile terminal of a user in the store. For example, Japanese Unexamined Patent Publication No. 2017-37574 discloses an advertisement providing system for realizing push notifications of advertisements at a frequency appropriate for a user and capable of maintaining advertisement effects.

SUMMARY

However, there has been a need for further improvement in Japanese Unexamined Patent Publication No. 2017-37574.

In one general aspect, the techniques disclosed here feature a method for a store management system connected to a store terminal corresponding to one branch store included in affiliated stores, the method including: acquiring, from the store terminal via a network, limited product information indicating a limited product for which a time available for sale in the one branch store corresponding to the store terminal is limited; acquiring, from a communication terminal of a user via the network, i) a request for a purchase menu of the affiliated stores and ii) a branch store identifier (ID) specifying the one branch store corresponding to a device ID specifying a beacon signal transmitter disposed in the one branch store, the beacon signal transmitter transmitting a beacon signal, the beacon signal being received by the communication terminal within a reception range of the beacon signal, the branch store ID being acquired by the communication terminal based on the device ID included in the beacon signal; generating, based on the limited product information, the request for the purchase menu, and the branch store ID, privileged purchase menu information corresponding to the one branch store in which the limited product indicated by the limited product information is added to a standard purchase menu of the affiliated stores; and outputting the privileged purchase menu information to the communication terminal.

According to the present disclosure, further improvement can be achieved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of a data configuration of a store dictionary;

FIG. 5 is a diagram illustrating an example of the data configuration of the store dictionary;

FIG. 19 is a sequence diagram illustrating an example of a process performed by an information providing system according to a third embodiment.

DETAILED DESCRIPTIONS

Figure 1:
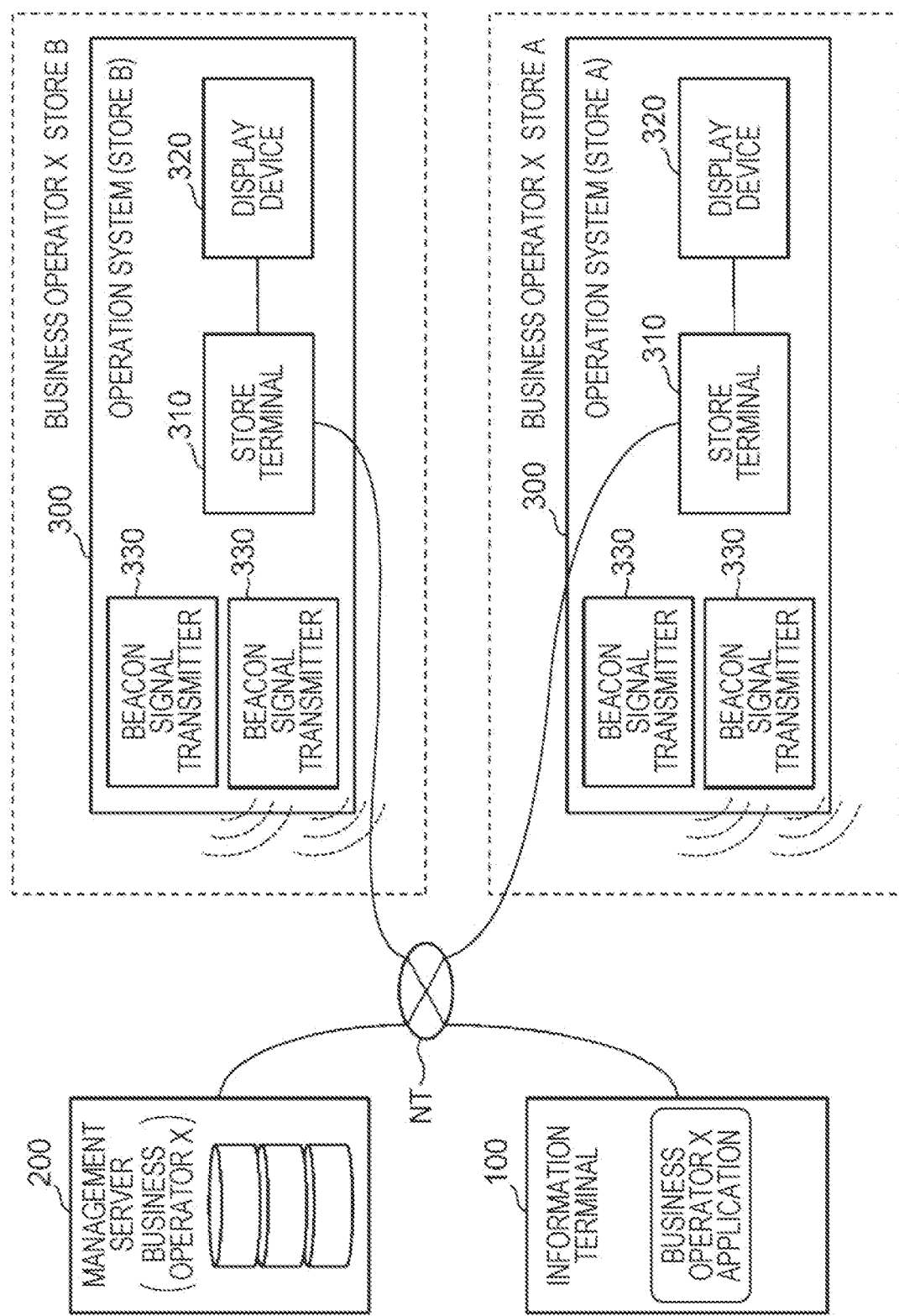
FIG. 1 is a block diagram illustrating an example of an overall configuration of an information providing system according to a first embodiment.

Underlying Knowledge Forming Basis of the Present Disclosure

In a store, a limited product for which a remaining time during which the product can be sold or a time slot during which the product can be sold (hereinafter, referred to as "time available for sale") is limited may be present. For example, in a supermarket, there are cases where unsold products are sold at a special price immediately before the closing of the store, or foods specially delivered on the day are sold at a special price during a limited sales time slot.

In addition, a fast-food store provides a service of receiving an order from a user via a mobile terminal from outside the store and providing a freshly cooked food to the user when the user visits the store. However, the user may cancel the food after the order. If such a food is sold at a special price as a limited product without being discarded, food waste can be expected to be prevented.

Japanese Unexamined Patent Publication No. 2017-37574 discloses that a push notification of an advertisement is displayed on a display of an information terminal that has received a beacon signal from a store. However, in Japanese Unexamined Patent Publication No. 2017-37574, the advertisement displayed on the display of the information terminal is merely an electronic advertisement of a paper medium, and there is room for further improvement in notifying the limited product.

Japanese Unexamined Patent Publication No. 2017-37574 further discloses that a push notification of an advertisement is displayed on a display of an information terminal on condition that a notification waiting time has elapsed after a user carrying the information terminal enters a shopping mall. However, in Japanese Unexamined Patent Publication No. 2017-37574, the user is not notified of the advertisement unless the notification waiting time has elapsed after the user entered the shopping mall. Therefore, it is not possible to timely notify the user of the limited product, and there is room for further improvement.

Based on the above findings, the present inventors have conceived the following aspects according to the present disclosure.

A method according to an aspect of the present disclosure is a method for a store management system connected to a store terminal corresponding to one branch store included in affiliated stores, the method including: acquiring, from the store terminal via a network, limited product information indicating a limited product for which a time available for sale in the one branch store corresponding to the store terminal is limited; acquiring, from a communication terminal of a user via the network, i) a request for a purchase menu of the affiliated stores and ii) a branch store identifier (ID) specifying the one branch store corresponding to a device ID specifying a beacon signal transmitter disposed in the one branch store, the beacon signal transmitter transmitting a beacon signal, the beacon signal being received by the communication terminal within a reception range of the beacon signal, the branch store ID being acquired by the communication terminal based on the device ID included in the beacon signal; generating, based on the limited product information, the request for the purchase menu, and the branch store ID, privileged purchase menu information corresponding to the one branch store in which the limited product indicated by the limited product information is added to a standard purchase menu of the affiliated stores; and outputting the privileged purchase menu information to the communication terminal.

According to this configuration, the limited product information indicating the limited product for which the time available for sale is limited is acquired via the network, and a privileged purchase menu including the limited product is displayed to a person who is within the reception range of the beacon signal from the one branch store.

Thus, for example, it is possible to timely provide information about the limited product, which changes from moment to moment depending on stock or time, to a person in the one branch store or in the vicinity of the one branch store through the communication terminal.

According to the present disclosure, the following effects are obtained when the limited product is a food whose commercial value significantly decreases with time, for example, a packed meal immediately before the best-before date.

That is, it is possible to reduce the food loss of foods provided by the one branch store by displaying the purchase menu including the limited product via the communication terminal to a person who is in the vicinity of the one branch store, who is likely to promptly pick up the limited product, and who is within the reception range of the beacon signal from the one branch store. When the limited product is inexpensive, the user can obtain the limited product at a low price.

Furthermore, according to this configuration, the privileged purchase menu information is generated in response to the request for the purchase menu of the affiliated stores from the user and is output to the communication terminal. Therefore, the privileged purchase menu is prevented from being displayed on the communication terminal against the will of the user, and the user can be prevented from being bothered.

In this configuration, the request for the purchase menu corresponding to the affiliated stores described in i) and the branch store ID described in ii) do not necessarily need to be divided into two. For example, i) and ii) may be indicated by specific information indicating that, in a case where the one branch store has the limited product in stock, it is desired to transmit privileged purchase menu information including the limited product to the communication terminal.

A method according to another aspect of the present disclosure is an information providing method for a store management system connected to a store terminal corresponding to one branch store included in affiliated stores, the method including: acquiring, from the store terminal via a network, limited product information indicating a limited product for which a time available for sale in the one branch store corresponding to the store terminal is limited; acquiring, from a communication terminal of a user via the network, i) a request for a purchase menu of the affiliated stores and ii) a branch store ID specifying the one branch store corresponding to a device ID specifying a beacon signal transmitter disposed in the one branch store, the beacon signal transmitter transmitting a beacon signal, the beacon signal being received by the communication terminal within a reception range of the beacon signal, the branch store ID being acquired by the communication terminal based on the device ID included in the beacon signal; generating, based on the limited product information, privileged purchase menu information corresponding to the one branch store, in which the limited product indicated by the limited product information is added to a standard purchase menu of the affiliated stores; and outputting, based on the request for the purchase menu and the branch store ID, the privileged purchase menu information corresponding to the one branch store to the communication terminal.

According to this configuration, the limited product information indicating the limited product for which the time available for sale is limited is acquired via the network, and a privileged purchase menu including the limited product is displayed to a person who is within the reception range of the beacon signal from the one branch store.

Thus, for example, it is possible to timely provide information about the limited product, which changes from moment to moment depending on stock or time, to a person in the one branch store or in the vicinity of the one branch store through the communication terminal.

According to the present disclosure, the following effects are obtained when the limited product is a food whose commercial value significantly decreases with time, for example, a packed meal immediately before the best-before date.

That is, it is possible to reduce the food loss of foods provided by the one branch store by displaying the purchase menu including the limited product via the communication terminal to a person who is in the vicinity of the one branch store, who is likely to promptly pick up the limited product, and who is within the reception range of the beacon signal from the one branch store. When the limited product is inexpensive, the user can obtain the limited product at a low price.

Furthermore, according to this configuration, the privileged purchase menu information is generated in response to the request for the purchase menu of the affiliated stores from the user and is output to the communication terminal. Therefore, the privileged purchase menu is prevented from being displayed on the communication terminal against the will of the user, and the user can be prevented from being bothered.

Furthermore, according to this configuration, in response to acquisition of the request for the purchase menu and the branch store ID, the communication terminal can display the privileged purchase menu information generated in advance based on the limited product information, and thus, it is possible to save the time and effort to generate the privileged purchase menu information each time the request for the purchase menu and the branch store ID are acquired.

In this configuration, the request for the purchase menu corresponding to the affiliated stores described in i) and the branch store ID described in ii) do not necessarily need to be divided into two. For example, i) and ii) may be indicated by specific information indicating that, in a case where the one branch store has the limited product in stock, it is desired to transmit the privileged purchase menu information including the limited product to the communication terminal.

A method according to still another aspect of the present disclosure is a method to be executed in a communication terminal that communicates with a store management system connected to a first store terminal corresponding to a first branch store in affiliated stores and a second store terminal corresponding to a second branch store in the affiliated stores, the method including: selecting the first branch store via an input device of the communication terminal; receiving one beacon signal from either a first beacon signal transmitter disposed in the first branch store or a second beacon signal transmitter disposed in the second branch store if the communication terminal is within a reception range of the one beacon signal, the one beacon signal including a first branch ID indicating the first branch store if the one beacon signal is a first beacon signal transmitted from the first beacon signal transmitter, the one beacon signal including a second branch ID indicating the second branch store if the one beacon signal is a second beacon signal transmitted from the second beacon signal transmitter; outputting, to the store management system via the network, the first branch store ID together with a request for a standard purchase menu of the affiliated stores if the first branch store ID indicating the selected first branch store matches one branch store ID included in the one beacon signal; and acquiring, in response to the request, from the store management system via the network, privileged purchase menu information corresponding to the first branch store in which limited product information indicating a limited product for which a time available for sale in the first branch store is limited is added to the standard purchase menu.

According to this configuration, the limited product information indicating the limited product for which the time available for sale is limited is acquired via the network, and a privileged purchase menu including the limited product is displayed to a person who is within the reception range of the beacon signal from the first branch store.

Thus, for example, it is possible to timely provide information about the limited product, which changes from moment to moment depending on stock or time, to a person in the first branch store or in the vicinity of the first branch store through the information terminal.

According to the present disclosure, the following effects are obtained when the limited product is a food whose commercial value significantly decreases with time, for example, a packed meal immediately before the best-before date.

That is, it is possible to reduce the food loss of foods provided by the first branch store by displaying the purchase menu including the limited product via the communication terminal to a person who is in the vicinity of the first branch store, who is likely to promptly pick up the limited product, and who is within the reception range of the beacon signal from the first branch store. When the limited product is inexpensive, the user can obtain the limited product at a low price.

Furthermore, according to this configuration, the privileged purchase menu information is generated in response to the request for the purchase menu of the affiliated stores from the user and is output to the communication terminal. Therefore, the privileged purchase menu is prevented from being displayed on the communication terminal against the will of the user, and the user can be prevented from being bothered.

The method may further include: outputting, to the store management system via the network, the request for the standard purchase menu of the affiliated stores if the first branch store ID indicating the selected first branch store does not match one branch store ID included in the one beacon signal; and acquiring, in response to the request, from the store management system via the network, standard purchase menu information of the affiliated stores.

For example, in a case where the limited product is a canceled food, if a user who is near the second branch store far away from the home orders the limited product of the first branch store near the home, the quality of the limited product may be degraded, e.g., become cold, when the limited product is picked up at the first branch store. Therefore, in this configuration, when the user is in or near a branch store different from the first branch store designated by the user, even if the user selects the first branch store, the standard purchase menu of the affiliated stores is displayed on the communication terminal of the user. Thus, for example, it is possible to prevent the user in or near the second branch store from ordering the limited product of the first branch store, and it is possible to prevent the limited product with degraded quality from being provided to the user.

Note that every processing in the above control method may be implemented in a communication terminal, may be provided as a program that causes a computer of the communication terminal to execute the processing, or may be provided as a recording medium storing the program.

First Embodiment

FIG. 1 is a block diagram illustrating an example of the overall configuration of an information providing system according to a first embodiment. The information providing system includes an information terminal 100, a management server 200 (an example of a store management system), and an operation system 300. The information terminal 100, the management server 200, and the operation system 300 are communicably connected to each other via a network NT. The network NT is configured by a wide area communication network including, for example, the Internet and a mobile phone communication network. The information terminal 100 is an example of a communication terminal.

The information terminal 100 is configured by a mobile information processing device such as a smartphone or a tablet terminal. The information terminal 100 is carried by a user to whom a service of a business operator X is provided. This service causes the information terminal 100 to display a purchase menu for purchasing a product that the store of the business operator X sells, and allows the user to purchase the product via the purchase menu. Application software of the business operator X (hereinafter referred to as a business operator X application) is installed in the information terminal 100. The business operator X application is application software for providing a service of the business operator X to a user.

The management server 200 is a cloud server composed of one or more computers. The management server 200 manages the types and stocks of products that the business operator X sells in stores, generates a purchase menu and causes the information terminal 100 to display the purchase menu, and receives an order from a user via the purchase menu.

A store A and a store B belong to the business operator X. The business operator X is a company that manages the store A and the store B. In this embodiment, the business operator X is a business operator that develops a fast-food chain such as a hamburger shop or a coffee shop. Therefore, the store A and the store B are branch stores belonging to fast-food chain affiliated stores developed by the business operator X. In the example in FIG. 1, two stores, which are the store A and the store B, are illustrated, but this is an example, and the number of stores managed by the business operator X may be three or more, or one. The business managed by the business operator X is not limited to fast food, and may be a business for manufacturing and selling packed meals, or may be a ready-made meal business for manufacturing and selling delicatessen and the like. Therefore, the products that the store sells in this embodiment are foods and drinks such as hamburgers, coffees, sweets, delicatessen, Sushi, packed meals, fruit juices, etc.

One or more operation systems 300 are present corresponding to each store. In the example in FIG. 1, two operation systems 300 respectively corresponding to the store A and the store B are illustrated. Each of the operation systems 300 is installed in a corresponding store, and performs product management, employee management, and the like in the corresponding store.

The operation system 300 includes a store terminal 310, a display device 320 (an example of a monitor), and a beacon signal transmitter 330. The store terminal 310 is configured by, for example, a desktop computer or a mobile information processing device such as a smartphone or a tablet terminal, and performs product management and employee management in the corresponding store. The store terminal 310 is connected to the management server 200 via the network NT, and transmits, to the management server 200 at any time, information such as the stock quantity of products that the store sells. The store terminal 310 generates information to be displayed on the display device 320 and outputs the information to the display device 320, and thereby, the information is displayed.

The display device 320 is constituted by, for example, a large-screen display device installed in a store front, and presents various kinds of information to users who visit the store. For example, under the control of the store terminal 310, the display device 320 displays screens for displaying the status of products ordered by the store illustrated in FIG. 15 and FIG. 16. Furthermore, when a limited product is generated due to the cancellation of an ordered product, the display device 320 displays information indicating the generation of the limited product. In this embodiment, the time available for sale of the limited product is shorter than 24 hours. The time available for sale may be, for example, shorter than 12 hours, shorter than 6 hours, shorter than 3 hours, shorter than 1 hour, shorter than 30 minutes, shorter than 15 minutes, shorter than 10 minutes, or shorter than 5 minutes. Note that different time periods may be set as the time available for sale according to the limited product.

The beacon signal transmitter 330 is installed in a store and transmits a beacon signal. One or more beacon signal transmitters 330 are disposed in the store or around the store so that, for example, a main area or all areas in the store and/or an area within a certain range around the store can fall within a communication range. As the beacon signal, a signal conforming to Bluetooth (registered trademark) can be adopted. However, this is an example. As the beacon signal, it is possible to adopt an infrared beacon signal, a wireless communication method that covers a relatively wide area with low power consumption called low power wide area (LPWA), a wireless communication method using a frequency of a 900 MHz level, which is less susceptible to an obstacle with low power consumption called Wireless Smart Utility Network (Wi-SUN), Wi-Fi (registered trademark), or a cellular network for mobile phones.

Figure 2:
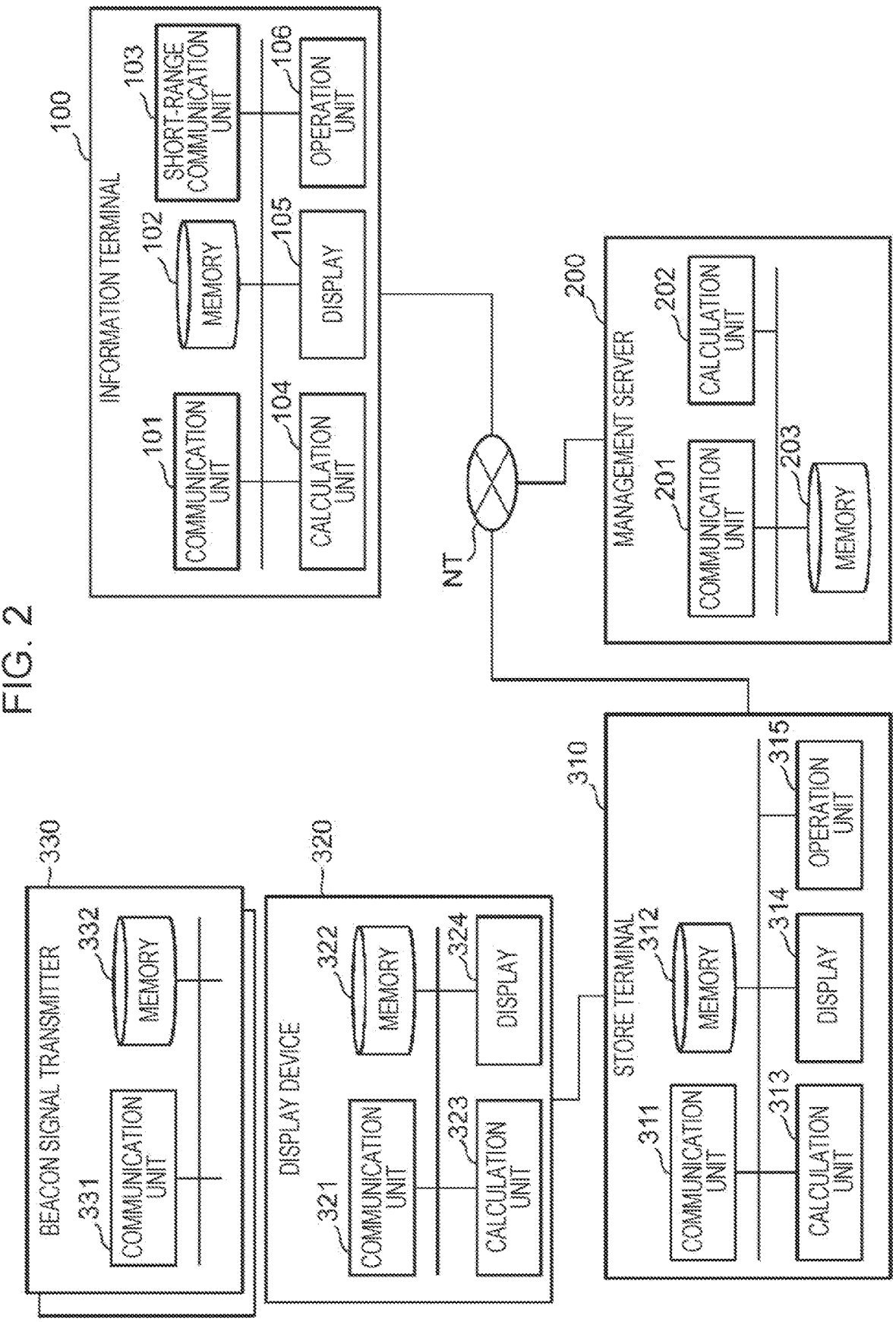
FIG. 2 is a block diagram illustrating an example of a detailed configuration of the information providing system according to the first embodiment.

FIG. 2 is a block diagram illustrating an example of a detailed configuration of the information providing system according to the first embodiment. The information terminal 100 includes a communication unit 101, a memory 102, a short-range communication unit 103, a calculation unit 104, a display 105, and an operation unit 106.

The communication unit 101 is configured by, for example, a communication circuit for connecting the information terminal 100 to the network NT. The communication unit 101 transmits, to the management server 200, for example, a store identifier (ID) of a store at which the user desires to pick up a product and a menu request by which the user desires to acquire purchase menu information. The communication unit 101 transmits, to the management server 200, order information indicating a product ordered by the user via the purchase menu.

The memory 102 is configured by a nonvolatile storage device such as a flash memory. The memory 102 stores, for example, a store dictionary for specifying a store (store ID) in which the beacon signal transmitter 330 is installed from a device ID of the beacon signal transmitter 330 included in the beacon signal.

The short-range communication unit 103 is configured by a communication circuit for performing short-range communication such as Bluetooth (registered trademark). The short-range communication unit 103 receives a beacon signal transmitted from the beacon signal transmitter 330.

The calculation unit 104 is configured by a processor such as a central processing unit (CPU), and controls the entire information terminal 100. The calculation unit 104 may determine that the reception of a beacon signal has been failed if the detection result of the beacon signal by the short-range communication unit 103 is, for example, "Unknown" illustrated in FIG. 3, and may determine that the reception of a beacon signal has been successful if the detection result is other than "Unknown". For example, the calculation unit 104 performs a process of specifying the store corresponding to the device ID included in the beacon signal received by the short-range communication unit 103 with reference to the store dictionary stored in the memory 102.

Specifically, if it is determined that the store ID of the store designated by the user matches the store ID corresponding to the device ID included in the beacon signal, the calculation unit 104 transmits the store ID and the menu request in association with each other to the management server 200 via a communication unit 201. On the other hand, if it is determined that the store ID of the store designated by the user does not match the store ID corresponding to the device ID included in the beacon signal, the calculation unit 104 does not transmit the store ID but transmits the menu request to the management server 200 via the communication unit 201.

The display 105 is configured by a display device such as a liquid crystal panel or an organic electroluminescent (EL) panel. The display 105 displays a purchase menu for users to order products of the store. The operation unit 106 includes, for example, a touch panel, and receives instructions from users. For example, the operation unit 106 receives an order instruction in which the user issues an instruction to order a product via the purchase menu.

The management server 200 includes the communication unit 201, a calculation unit 202, and a memory 203. The communication unit 201 is configured by a communication circuit that connects the management server 200 to the network NT. The communication unit 201 receives, for example, the menu request and the like transmitted from the information terminal 100, and receives order information indicating the order content. Furthermore, the communication unit 201 transmits purchase menu information for causing the information terminal 100 to display the purchase menu. The purchase menu information may include, for example, layout information for specifying a display position or the like of a graphical user interface (GUI) component constituting the purchase menu and/or various image data of the GUI component. As will be described later, there are two types of purchase menu information, which are privileged purchase menu information and standard purchase menu information. Furthermore, the communication unit 201 receives, from the store terminal 310, limited product information indicating a limited product for which the time available for sale in the store corresponding to the store terminal 310 is limited. Furthermore, the communication unit 201 receives sold-out information indicating that the limited product has been sold out in the store.

The calculation unit 202 is configured by a processor such as a CPU, and controls the entire management server 200. The calculation unit 202 acquires, via the communication unit 201, the limited product information indicating the limited product for which the time available for sale in the store corresponding to the store terminal 310 is limited. In a case where the limited product information is acquired, upon reception of the store ID and the menu request from the information terminal 100 via the communication unit 201, the calculation unit 202 generates privileged purchase menu information in which the limited product indicated by the limited product information is added to the standard purchase menu, and transmits the privileged purchase menu information to the information terminal 100 via the communication unit 201. The standard purchase menu is a purchase menu that is common to all stores in the affiliated stores of the business operator X.

In a case where the sold-out information indicating that the limited product has been sold out is received via the communication unit 201, upon reception of the store ID and the menu request from the information terminal 100 via the communication unit 201, the calculation unit 202 transmits the standard purchase menu information which is purchase menu information not including the limited product to the information terminal 100 via the communication unit 201.

In a case where the limited product information is received via the communication unit 201, upon reception of the menu request, instead of the store ID, from the information terminal 100 via the communication unit 201, the calculation unit 202 transmits the standard purchase menu information to the information terminal 100 via the communication unit 201.

The memory 203 stores, for example, a product database that manages products that each store sells and the stock quantity of the products. The memory 203 stores, for example, a purchase history database that manages a purchase history of products that each store sells.

The store terminal 310 includes a communication unit 311, a memory 312, a calculation unit 313, a display 314, and an operation unit 315. The communication unit 311 is configured by a communication circuit that connects the store terminal 310 to the network NT. The communication unit 311 transmits the limited product information and the sold-out information to the management server 200. Note that the store terminal 310 and the display device 320 are connected to each other via, for example, a local area network. Therefore, the communication unit 311 may have a communication function of communicating with the display device 320 via the local area network.

The memory 312 stores, for example, a store product database, for each store, which manages the types of products that the store sells, the stock quantity of the products, and the like. The memory 312 stores, for example, a work database that manages work statuses, work schedules, actual working hours, and the like of employees of the store.

The calculation unit 313 is configured by a processor such as a CPU. In a case where an input instruction (an example of a first instruction) for displaying the limited product information on the display device 320 from an employee of the store is acquired, or in a case where the generation of a limited product due to cancellation of an order or the like is detected, the calculation unit 313 outputs a command and/or display data for displaying the limited product information to the display device 320. The calculation unit 313 transmits the limited product information to the management server 200 in synchronization with the output of the command and/or display data for displaying the limited product information. Thus, the management server 200 can acquire the limited product information in synchronization with the input instruction for displaying the limited product information or at the same time as the calculation unit 313 detecting the generation of the limited product.

In a case where an input instruction (an example of a second instruction) for deleting the limited product information, which is displayed, is acquired, or in a case where it is detected that the limited product is sold out, the calculation unit 313 outputs a command and/or display data for deleting the limited product information to the display device 320. In synchronization with the output of the command and/or display data for deleting the limited product information, the calculation unit 313 transmits, to the management server 200, the sold-out information indicating that the product indicated by the limited product information is sold out. Thus, the management server 200 can acquire the sold-out information in synchronization with the input instruction for deleting the limited product information or at the same time as the calculation unit 313 detecting that the limited product is sold out.

The display 314 is configured by a display device such as a liquid crystal panel or an organic EL panel. The operation unit 315 includes input devices such as a keyboard and a mouse. The operation unit 315 acquires an input instruction for displaying the limited product information and an input instruction for deleting the limited product information input by an employee. Note that the operation unit 315 may also include a touch panel.

The display device 320 includes a communication unit 321, a memory 322, a calculation unit 323, and a display 324. The communication unit 321 is configured by a communication circuit for connecting the display device 320 to a local area network. The communication unit 321 receives, from the store terminal 310, a command and/or display data for displaying the limited product information and a command and/or display data for deleting the limited product information.

The memory 322 stores image data and the like to be displayed on the display 324. The calculation unit 323 is configured by a processor such as a CPU. The calculation unit 323 causes the display 324 to display the limited product information upon acquisition of the command and/or display data for displaying the limited product information, and deletes the limited product information from the display 324 upon acquisition of the command and/or display data for deleting the limited product information. The display 324 is configured by a display device such as a liquid crystal panel, an organic EL panel, or a projector and displays the limited product information and the like under the control of the calculation unit 323.

The beacon signal transmitter 330 is, for example, a transmitter conforming to the Bluetooth Low Energy (BLE) standard, and includes a communication unit 331 and a memory 332. The communication unit 331 periodically transmits a beacon signal including the device ID stored in the memory 332. The beacon signal is used to detect and determine whether a certain user carrying the information terminal 100 in which the business operator X application is installed is present in a certain store or in the vicinity of the store. There is a case where the area of the store is larger than the reach range of the beacon signal. In this case, by installing a plurality of beacon signal transmitters 330 in the store, it is possible to detect and determine that the user is in the store or in the vicinity of the store without exception.

The memory 332 is configured by a rewritable nonvolatile storage device such as a flash memory, and stores a device ID for uniquely specifying the beacon signal transmitter 330.

Figure 3:
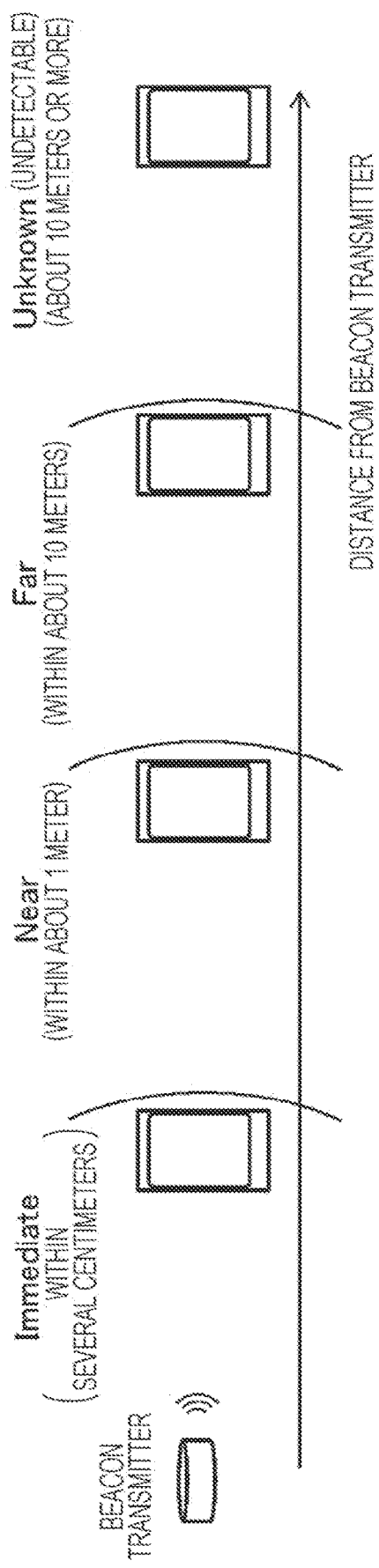
FIG. 3 is an explanatory diagram relating to a beacon signal.

FIG. 3 is an explanatory diagram relating to a beacon signal. A platform called iBeacon (registered trademark, the same applies hereinafter) is known as a standard of the beacon signal, and iBeacon is illustrated in the example in FIG. 3. In iBeacon, the distance between the beacon signal transmitter 330 and the information terminal 100 is measured based on the radio wave intensity when the information terminal 100 receives the beacon signal. In iBeacon, the measured distance may be roughly classified into four types: Immediate, Near, Far, and Unknown. For example, Immediate indicates that the distance between the beacon signal transmitter 330 and a smartphone is within several centimeters; Near indicates that the distance is within about 1 m; Far indicates that the distance is within about 10 m; and Unknown indicates that the distance is greater than or equal to about 10 m and a beacon signal is undetectable.

The beacon signal includes a universally unique identifier (UUID). A service or the like can be identified by embedding unique data in the UUID. As a setting format of the value of the UUID, for example, a format conforming to ISO/IEC11578 can be adopted.

Since a UUID is used for identification of a service or the like in iBeacon, the information terminal 100 is incapable of responding to a beacon signal unless a smartphone application that knows a beacon ID or the like is installed in the information terminal 100. Therefore, it is necessary to install in advance a smartphone application corresponding to the UUID of a specific beacon signal in the information terminal 100 in iBeacon.

Another known platform for beacon signals is Eddystone (registered trademark). Eddystone includes a UID type and a URL type. In the UID type, since the beacon ID is transmitted as in iBeacon, it is necessary to install in advance an application corresponding to the beacon ID in the information terminal 100. In the URL type, a chrome browser can automatically designate a URL to access. Therefore, in a case of the URL type, the information terminal 100 only needs to have a chrome browser, and does not need to have an application corresponding to a specific beacon ID.

In this embodiment, based on reception of the beacon ID (device ID), a service such as notification of a purchase menu is provided to the user. Therefore, it is assumed that the business operator X application, which is a dedicated application having a function of responding to a beacon signal, is installed in the information terminal 100, and that the beacon ID (device ID), which is unique service identification information, is included in the beacon signal. In this embodiment, both iBeacon and Eddystone can be adopted. When the URL type of Eddystone is adopted, the information terminal 100 does not need to have the business operator X application, and only needs to have a chrome browser.

FIGS. 4 and 5 are diagrams illustrating examples of a data configuration of a store dictionary. FIG. 4 is a store directory for a case where iBeacon is adopted, and FIG. 5 is a store directory for a case where the UID type of Eddystone is adopted. In a case of iBeacon, the store dictionary stores the device ID and store information in association with each other. The device ID includes a UUID, a Major value, and a Minor value. The UUID indicates an identifier of the business operator X. The Major value indicates an identifier of a store of the business operator X. The Minor value indicates a detailed position in the store indicated by the Major value. The store information includes a business operator ID, a store ID, and the detailed position in the store.

For example, in the first row, the business operator X, the store A, and the north of the 1F are associated with the UUID "0000-0000-0000-000X", the Major value "A", and the Minor value "1N". Therefore, when the device ID in the first row is included in the received beacon signal, it is understood that the beacon signal is a signal transmitted from the beacon signal transmitter 330 installed in the north of the 1F of the store A of the business operator X. Therefore, it is understood that a user of the information terminal 100 that has received this beacon signal is located in the north of the 1F of the store A of the business operator X.

In a case of the UID type of Eddystone, the device ID includes a frame type, a namespace ID, and an instance ID, and the store information is the same as that in iBeacon. The frame type indicates the type of Eddystone. Here, "0" described in the frame type indicates the UID type. The namespace ID indicates a business operator and a store. The instance ID indicates a detailed position in the store. For example, in the first row, the business operator X, the store A, and the 1F entrance are associated with the frame type "0", the namespace ID "X-A", and the instance ID "1F-ENT". Therefore, it is understood that a user of the information terminal 100 that has received this beacon signal is at the entrance of the 1F of the store A of the business operator X.

The associations between the beacon ID and the store information are examples, and any setting and operation may be performed as long as the association between the beacon ID and the store information can be realized.

Note that the position information of the user may be specified by combining the received beacon ID with a position information detection function provided in the information terminal 100 (for example, position determination by Global Positioning System, region determination by a connected mobile base station, and the like).

Next, a process performed by the information providing system according to the first embodiment will be described. In the first embodiment, each time a menu request is transmitted from the information terminal 100, the management server 200 generates privileged purchase menu information.

Figure 6:
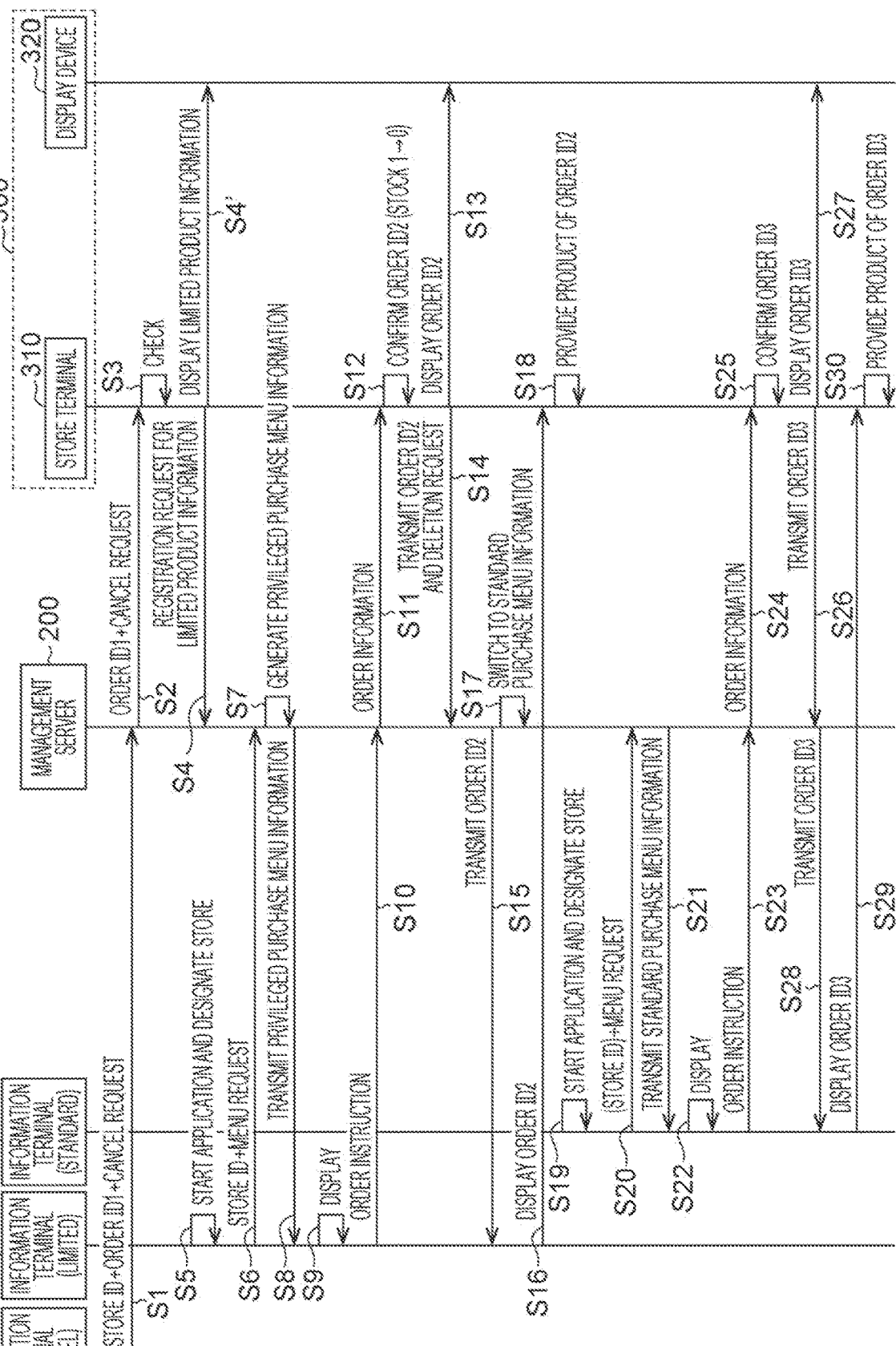
FIG. 6 is a sequence diagram illustrating an example of a process performed by the information providing system according to the first embodiment.

FIG. 6 is a sequence diagram illustrating an example of the process performed by the information providing system according to the first embodiment. In FIG. 6, an information terminal 100A indicates an information terminal 100 that cancels an ordered product. An information terminal 100B indicates an information terminal 100 that receives privileged purchase menu information. An information terminal 100C indicates an information terminal 100 that receives standard purchase menu information. In FIG. 6, users of the information terminals 100A, 100B, and 100C order products of the same store. This store may be a store where the users stop by while traveling, for example, on the way home, regardless of the current locations of the users.

The information terminal 100A to which a cancel instruction is input by the user transmits a store ID, an order ID1, and a cancel request in association with each other to the management server 200 (step S1). The store ID is an identifier of a store for which the user has ordered a product. The order ID1 is an identifier of an order, and is an identifier of an order to be canceled this time. In step S1, the user can cancel the order by inputting, for example, a store name and information specifying the order on a cancel screen of the business operator X application.

Subsequently, the management server 200 transmits the received order ID1 and the received cancel request in association with each other to the store terminal 310 of the store indicated by the received store ID (step S2).

Subsequently, the store terminal 310 checks whether the canceled product indicated by the order ID can be resold (step S3). In this case, the store terminal 310 presents information on the canceled product to an employee, and when the employee inputs an instruction to permit resale, the store terminal 310 may also check a remaining time during which the canceled product can be resold.

Note that the store terminal 310 may automatically determine whether the canceled product can be resold and, if possible, the remaining time during which the canceled product can be resold.

The management server 200 may automatically determine whether the canceled product can be resold and, if possible, the remaining time during which the canceled product can be resold, and may notify the store terminal 310 of the determination result together with the information on the canceled product.

Having checked that resale is possible, the store terminal 310 determines the canceled product as a limited product, and transmits a registration request for limited product information indicating the limited product to the management server 200 (step S4). As a result, the store terminal 310 registers the limited product information in the store product database, and sets the stock quantity of the limited product (here, it is assumed to be one). Furthermore, having received the registration request for the limited product information, the management server 200 registers the limited product information in the product database of the corresponding store. Subsequently, the store terminal 310 causes the display device 320 to display the limited product information (steps S4').

In step S5, the information terminal 100B starts the business operator X application in accordance with an instruction from the user, and receives an input instruction from the user to designate a store from which the user desires to purchase a product.

Subsequently, the information terminal 100B determines whether a beacon signal corresponding to the designated store has been successfully received. Since the beacon signal has been successfully received, the information terminal 100B transmits the store ID of the designated store and a menu request to the management server 200 (step S6).

In step S6, the information terminal 100B may specify the store ID corresponding to the device ID included in the beacon signal using the store dictionary stored in the memory 102, and, if the specified store ID matches the store ID of the designated store, may determine that the beacon signal corresponding to the designated store has been successfully received. The menu request transmitted in step S6 is an example of a request for a purchase menu.

Subsequently, since the limited product information is registered in the store indicated by the received store ID in step S4, the management server 200 generates privileged purchase menu information corresponding to the store (step S7). Here, the privileged purchase menu information includes a product indicated by the limited product information for which the time available for sale is limited in the store designated by the user, in addition to products indicated by standard purchase menu information of the affiliated stores. Thus, it is possible to notify the limited product information only to users who have visited the store designated through the business operator X application or users in the vicinity of the store, and it is possible to motivate the users to visit the store.

Subsequently, the management server 200 transmits the privileged purchase menu information to the information terminal 100B (step S8). Subsequently, the information terminal 100B displays a privileged purchase menu on the display 105 (step S9). Thus, the user can browse the privileged purchase menu.

Subsequently, the information terminal 100B receives an order instruction for the limited product from the user who has browsed the privileged purchase menu, and transmits order information indicating the order content to the management server 200 (step S10). Subsequently, the management server 200 transmits the order information to the store terminal 310 (step S11).

Subsequently, the store terminal 310 issues an order ID2 of the order for the limited product to confirm the order ID2 (step S12). At this time, the store terminal 310 updates the stock quantity of the limited product. In this example, resale of one limited product is confirmed, and the stock quantity of the limited product becomes zero. Subsequently, the store terminal 310 causes the display device 320 to display the order ID2 (step S13). Furthermore, the store terminal 310 transmits the order ID2 to the management server 200, and also transmits a deletion request for the limited product to the management server 200 (step S14). The deletion request for the limited product corresponds to an example of sold-out information. Having received the deletion request, the management server 200 deletes the limited product information registered in the product database of the corresponding store.

Subsequently, the management server 200 transmits the order ID2 to the information terminal 100B (step S15). Subsequently, the information terminal 100B displays the order ID2 on the display 105 (step S16). This allows the user to check the order ID2.

Having received the deletion request for the limited product information, the management server 200 switches the setting of the purchase menu of the corresponding store from the privileged purchase menu information to the standard purchase menu information (step S17).

Subsequently, when an employee who has checked the information terminal 100B on which the order ID2 is displayed completes provision of the limited product to the user, the employee inputs, to the store terminal 310, provision completion information indicating the completion, and the store terminal 310 registers the provision completion information in the store product database (step S18).

In step S19, the information terminal 100C starts the business operator X application in accordance with an instruction from the user, and receives an input instruction from the user to designate a store from which the user desires to purchase a product. Subsequently, the information terminal 100C determines whether the beacon signal corresponding to the designated store has been successfully detected, and, if the beacon signal has been successfully detected, transmits the store ID of the designated store and a menu request to the management server 200 (step S20). If the detection of the beacon signal has been failed in step S20, the information terminal 100C may transmit a menu request to the management server 200 without transmitting the store ID of the designated store. Thus, if the store ID is transmitted together with the menu request, the management server 200 can transmit the privileged purchase menu information to the information terminal 100, and if the store ID is not transmitted together with the menu request or if a preset invalid store ID is transmitted together with the menu request, the management server 200 can transmit the standard purchase menu information to the information terminal 100. Here, the information terminal 100C may refer to the store dictionary stored in the memory 102 to determine whether the beacon signal corresponding to the designated store has been successfully detected.

Subsequently, since the setting of the purchase menu information is switched to the standard purchase menu information in step S17, the management server 200 transmits the standard purchase menu information to the information terminal 100C (step S21). The standard purchase menu information is common to all stores and is generated in advance. Thus, in step S21, without generating the standard purchase menu, the management server 200 may read the standard purchase menu information generated in advance from the memory 203 and transmit it to the information terminal 100C.

Subsequently, the information terminal 100C displays the standard purchase menu on the display 105 (step S22). This allows the user to browse the standard purchase menu.

Subsequently, the information terminal 100C receives an order instruction for a product from the user who has browsed the standard purchase menu, and transmits order information to the management server 200 (step S23). Subsequently, the management server 200 transmits the order information to the store terminal 310 (step S24).

Subsequently, the store terminal 310 issues an order ID3 of the order for the product to confirm the order ID3 (step S25). Subsequently, the store terminal 310 transmits the order ID3 to the management server 200 (step S26). Subsequently, the store terminal 310 causes the display device 320 to display the order ID3 (step S27).

Subsequently, the management server 200 transmits the order ID3 to the information terminal 100C (step S28). Subsequently, the information terminal 100C displays the order ID3 on the display 105 (step S29). This allows the user to check the order ID3.

Subsequently, when an employee who has checked the information terminal 100C on which the order ID3 is displayed completes provision of the product indicated by the order ID3 to the user, the employee inputs, to the store terminal 310, provision completion information indicating the completion, and the store terminal 310 registers the provision completion information in the store product database (step S30).

Figure 7:
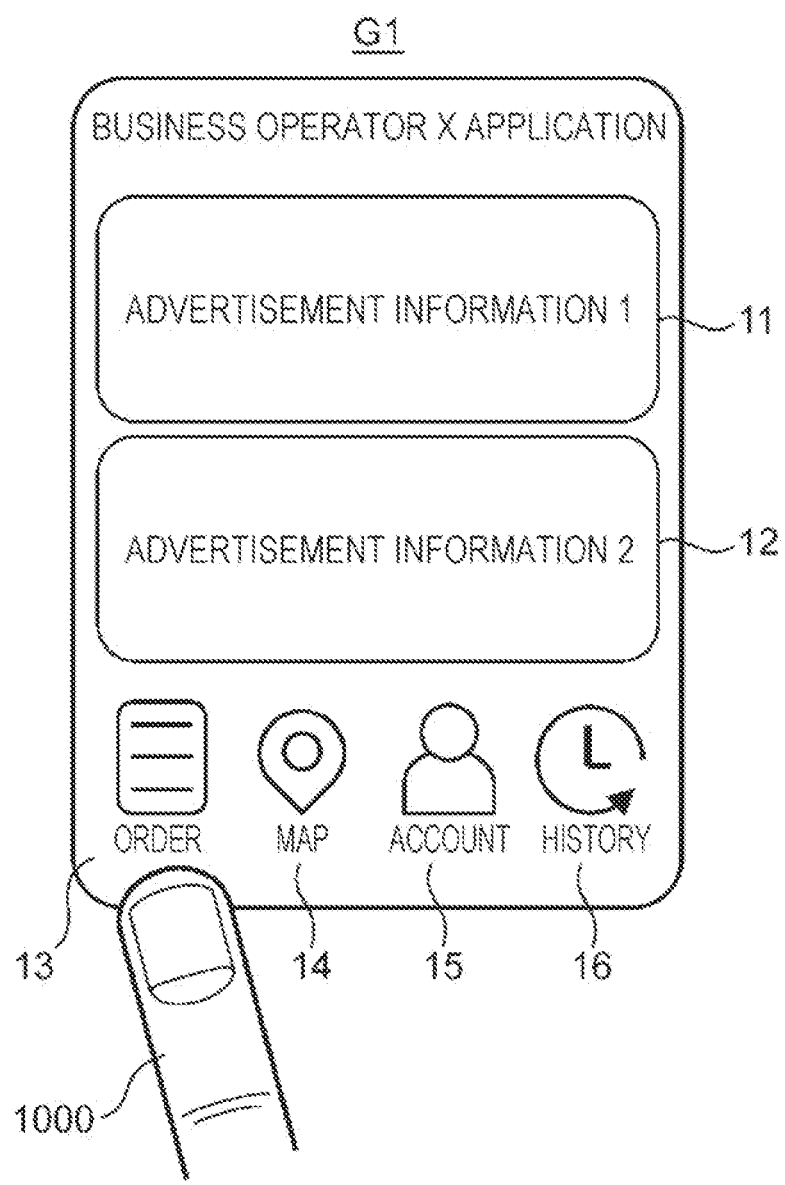
FIG. 7 is a diagram illustrating an example of an initial screen of a business operator X application.

FIG. 7 is a diagram illustrating an example of an initial screen G1 of the business operator X application. The initial screen G1 is displayed on the display 105 when a user inputs an instruction to start the business operator X application to the information terminal 100. The initial screen G1 includes an advertisement display field 11 and an advertisement display field 12 displayed at the center. In each of the advertisement display field 11 and the advertisement display field 12, an advertisement of a recommended product, service, or the like of the business operator X is displayed. The number of advertisement display fields may be one, or three or more.

In a lower part of the initial screen G1, an order button 13, a map button 14, an account button 15, and a history button 16 are provided. The order button 13 is a button to be selected when a product or the like is ordered from the business operator X application. Hereinafter, the selection operation is referred to as "touch". The map button 14 is a button to be touched in order to check stores of the business operator X on a map around the current location. The account button 15 is a button to be touched when registering, checking, or updating a user account. The history button 16 is a button to be touched when referring to the user's past order history.

Figure 8:
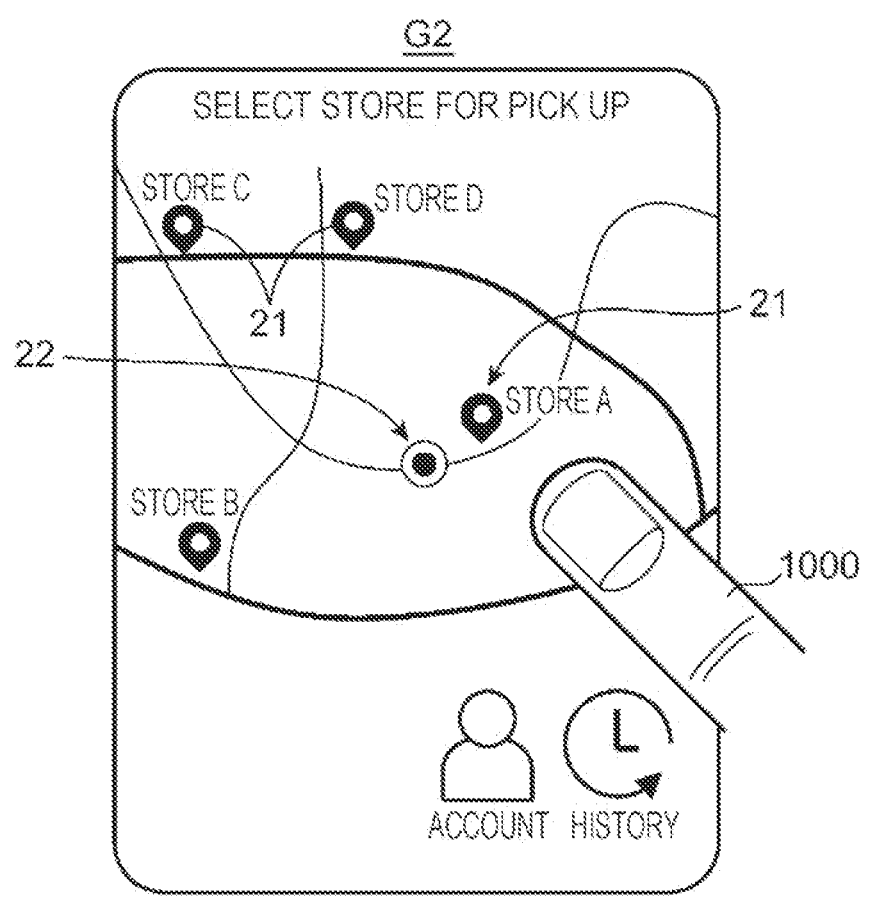
FIG. 8 is a diagram illustrating an example of a map screen.

FIG. 8 is a diagram illustrating an example of a map screen G2. The map screen G2 is displayed when the map button 14 is touched on the initial screen G1. A map around the current location of the user is displayed on the map screen G2. On the map screen G2, a current location icon 22 indicating the current location of the user is displayed. On the map screen G2, store icons 21 indicating stores around the current location are displayed. Here, four store icons 21 of stores A, B, C, and D are displayed, and the user can understand that there are four stores belonging to the business operator X around the current location. The user browses the map screen G2 and selects a store to order a product. In this example, the user touches the store icon 21 of the store A with an indicator 1000 to select the store A. The indicator 1000 is, for example, a finger of the user. Upon the store icon 21 of the store A being touched, the information terminal 100 determines whether a beacon signal corresponding to the store A has been successfully received, and, if the beacon signal corresponding to the store A has been successfully received, transmits the store ID of the store A and a menu request to the management server 200, and, if the reception of the beacon signal corresponding to the store A has been failed, transmits the menu request to the management server 200. This processing corresponds to steps S6 and S20 in FIG. 6. Here, since the information terminal 100 is outside the communication range of the beacon signal corresponding to the store A and the reception of the beacon signal has been failed, the store ID of the store A is not transmitted, and the menu request is transmitted. Therefore, the standard purchase menu information is transmitted from the management server 200 to the information terminal 100.

Figure 9:
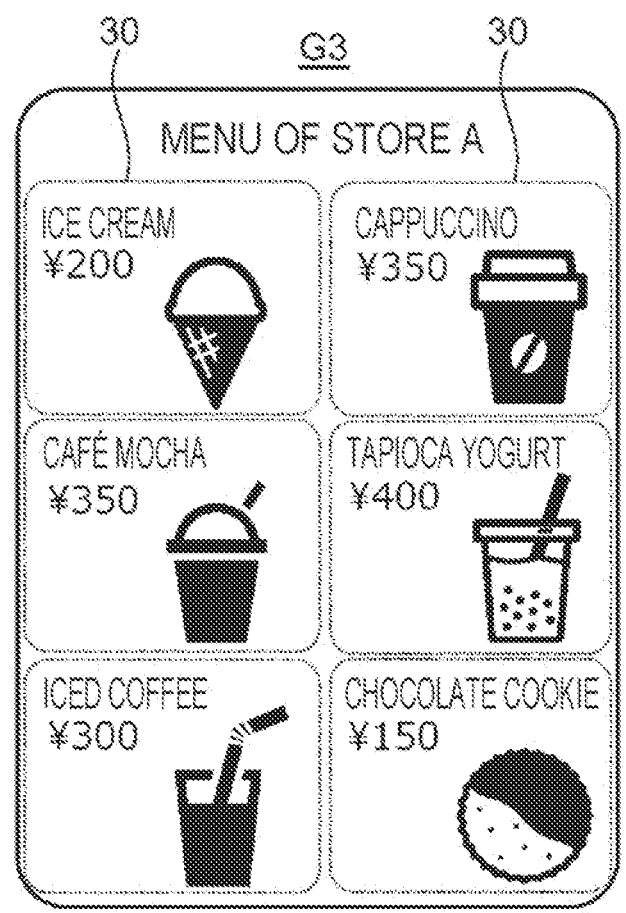
FIG. 9 is a screen diagram illustrating an example of a standard purchase menu.

FIG. 9 is a screen diagram illustrating an example of a standard purchase menu G3. The standard purchase menu G3 displays products that the user can order in the store A that the user selects. Here, since the store A is a fast-food store, the products that the user can order are food and drink. In the standard purchase menu G3, tile objects 30 corresponding to a plurality of orderable products are displayed. Each of the tile objects 30 has a rectangular outer frame, and displays a product name, a price of the product, and an image indicating the product. Here, since the store A provides food and drink, the tile objects 30 corresponding to the respective food and drink such as ice cream and cappuccino are displayed.

Although the tile objects 30 here are arranged in three rows×two columns, this is an example. In addition, the tile objects 30 have the same size. When a scroll operation is input on the standard purchase menu G3, the information terminal 100 scrolls the standard purchase menu G3 and displays tile objects 30 that have not been displayed on the display 105. Thus, the user can cause the display 105 to display tile objects 30 of products hidden on the initial screen of the standard purchase menu G3, and can order any of the products.

The standard purchase menu information includes layout information for specifying display positions of the tile objects 30 on the standard purchase menu G3, a priority order of the products, image data of the tile objects 30, and the like. Therefore, the information terminal 100 may draw the standard purchase menu G3 by arranging the tile objects 30 corresponding to the products in descending order of priorities in accordance with the layout information. The priority order of the products is defined in advance in the affiliated stores. For example, the order may be such that a more popular product has a higher priority.

Figure 10:
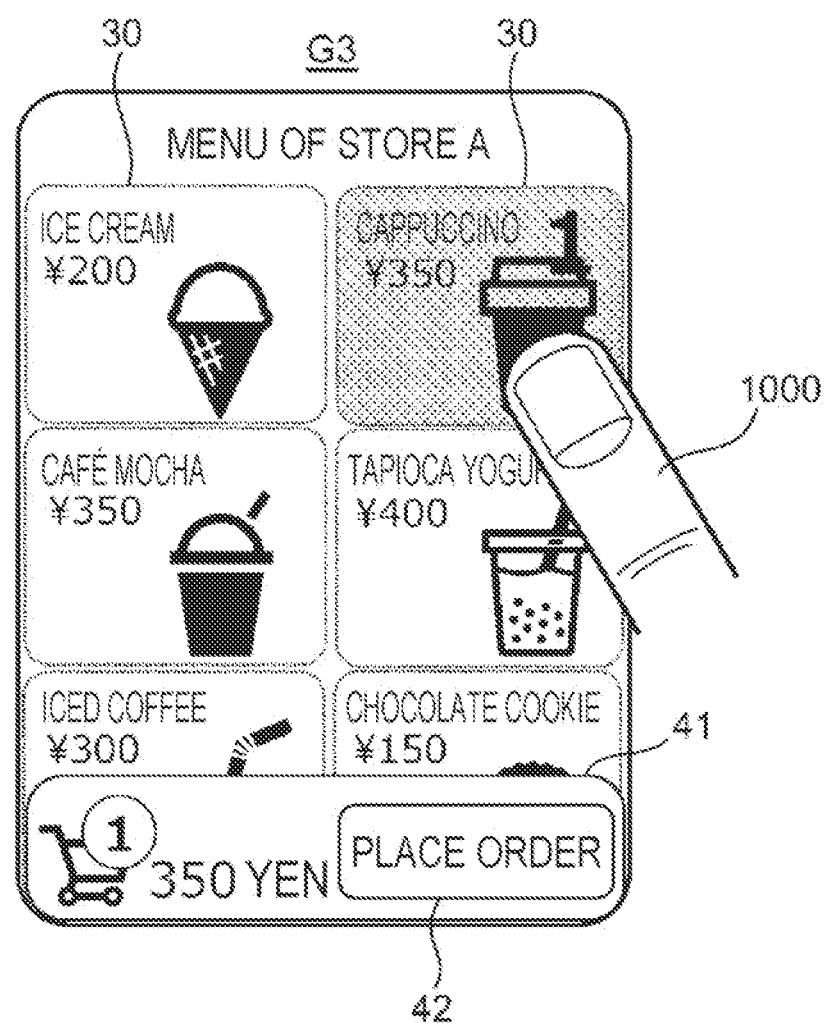
FIG. 10 is a diagram illustrating a standard purchase menu in which an order field is superimposed and displayed.

FIG. 10 is a diagram illustrating the standard purchase menu G3 in which an order field 41 is superimposed and displayed. When the user touches a tile object 30 of a desired product with the indicator 1000, the information terminal 100 superimposes and displays the order field 41 in a lower part of the standard purchase menu G3.

The order field 41 includes the number of ordered products, the price of the ordered product, and an order button 42. Here, the tile object 30 of a cappuccino is touched by the indicator 1000. Therefore, "1" indicating the number of ordered cappuccinos and the price of the cappuccino are displayed in the order field 41. Note that the user can order a plurality of same products by touching the same tile object 30 a plurality of times. The user can also select a plurality of products of different types by touching a plurality of different tile objects 30. Having completed the order operation, the user touches the order button 42. Upon the order button 42 being touched, the information terminal 100 transmits order information including the type and the number of ordered products to the management server 200. Thus, the order is received. This processing corresponds to step S23 in FIG. 6.

Figure 11:
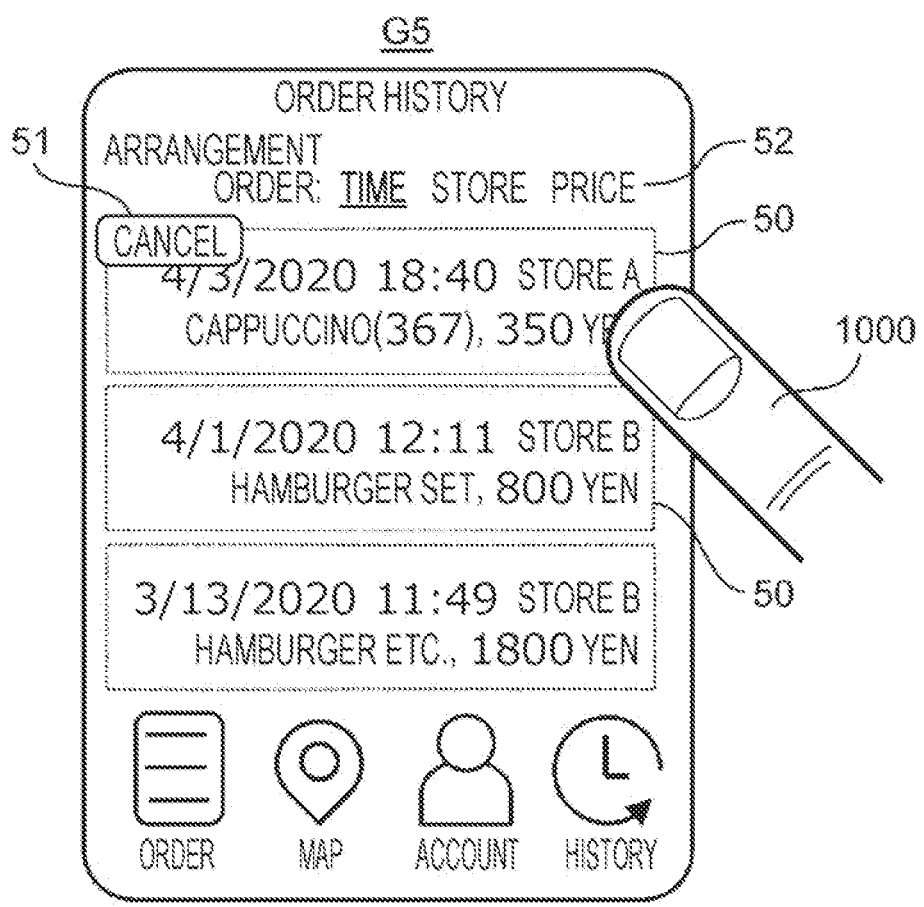
FIG. 11 is a diagram illustrating an example of an order history screen.
Figure 12:
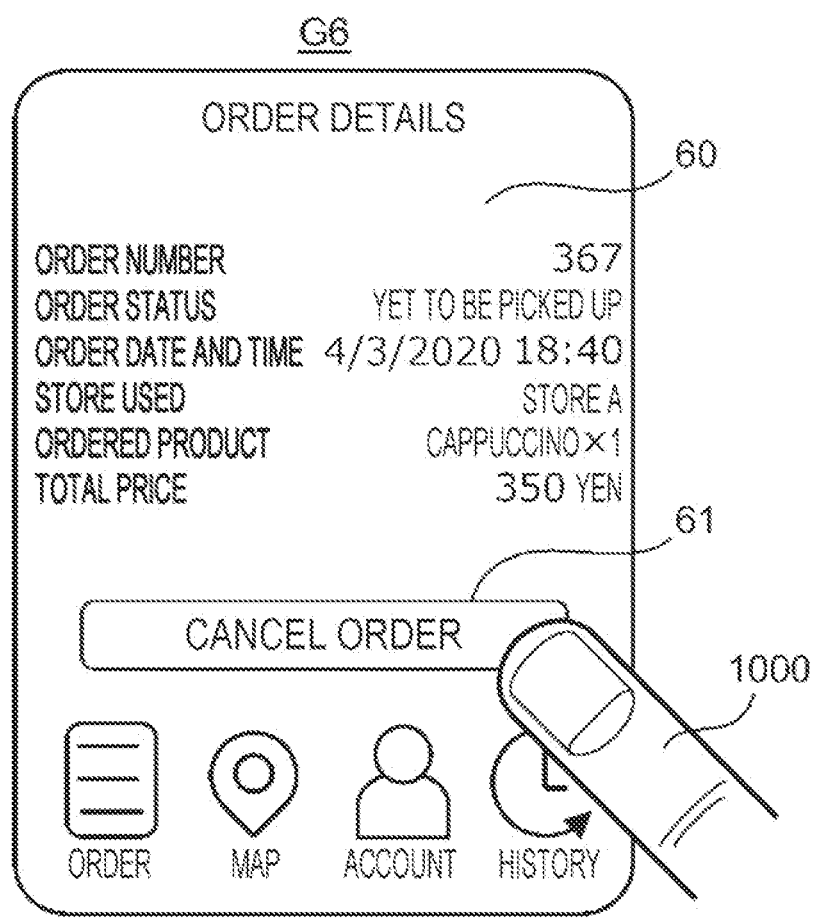
FIG. 12 is a diagram illustrating an example of an order detail screen.

FIG. 11 is a diagram illustrating an example of an order history screen G5. FIG. 12 is a diagram illustrating an example of an order detail screen G6. The order history screen G5 is displayed upon the history button 16 being touched on the initial screen G1. The order history screen G5 is a screen displaying, as a list, the order history of products ordered by the user in the past using the business operator X application. The order history screen G5 includes order history fields 50 corresponding to the respective past orders.

An arrangement order change field 52 for changing the arrangement order of the order history fields 50 is provided in an upper part of the order history screen G5. In the arrangement order change field 52, "time", "store", and "price" are displayed. When "time" is touched, the order history fields 50 are rearranged in order from the most recent order time. When "store" is touched, the order history fields 50 are rearranged according to the store designated for pick up. When "price" is touched, the order history fields 50 are rearranged in descending order or ascending order of the ordered price. The order history screen G5 is configured to be scrollable. Therefore, by scrolling the order history screen G5, the user can cause order history fields 50 that have not been displayed on the initial screen of the order history screen G5 to be displayed, and can check the past order history.

In each of the order history fields 50, an order date, an order time, an order store, a product name of an ordered product, and a total price of ordered products are displayed. For example, in the order history field 50 in the first row, a past order for the store A at 18:40 on Apr. 3, 2020 is displayed. Here, since a cappuccino has been ordered, "cappuccino", which is a product name, and "350 yen", which is the price of the cappuccino, are displayed in the order history field 50. The numeral (367) in parentheses after the product name "cappuccino" is an order number. The order number is displayed only when a product is yet to be picked up. A cancel button 51 is displayed at the left end of the order history field 50 indicating an order for a product that is yet to be picked up. The cancel button 51 is touched to cancel an ordered product.

Upon the cancel button 51 being touched, the information terminal 100 displays the order detail screen G6 on the display 105. The order detail screen G6 is a screen that displays details of the past order indicated by the order history field 50 for which the cancel button 51 is touched.

The order detail screen G6 includes an order content field 60 and an order cancel button 61. In the order content field 60, an order number, an order status, an order date and time, a store used, an ordered product, and a total price are displayed. The order status indicates a state of the ordered product. The state includes "waiting to be picked up" in which the product is yet to be picked up, "picked up" in which the product is picked up, and the like. When the user browses the order detail screen G6 and determines cancellation, the user touches the order cancel button 61. Upon the order cancel button 61 being touched, the information terminal 100 transmits the store ID (the ID of the store A), the order ID (367), and a cancel request in association with each other to the management server 200. This processing corresponds to step S1 in FIG. 6. Thus, a limited product is generated.

Figure 13:
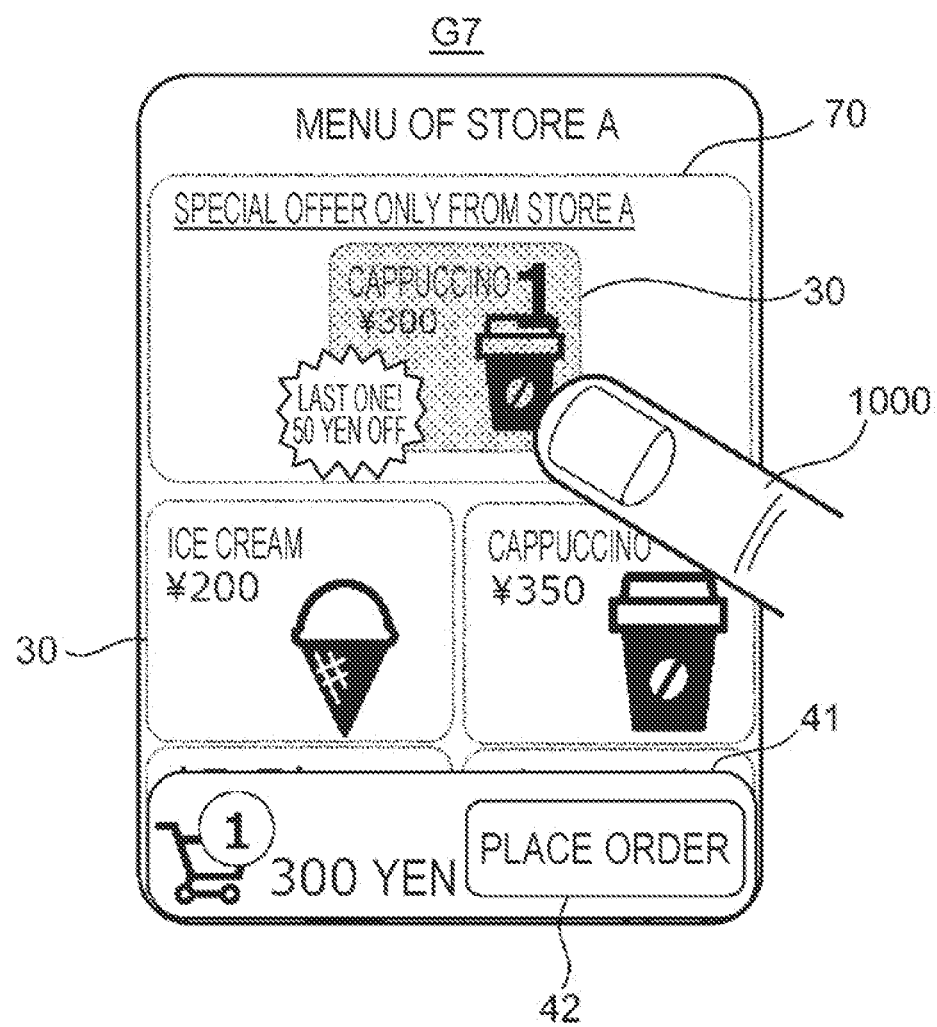
FIG. 13 is a screen diagram illustrating an example of a privileged purchase menu.

FIG. 13 is a screen diagram illustrating an example of a privileged purchase menu G7. The privileged purchase menu G7 is displayed when the user is near the store A designated by the user for pick up on the map screen G2, at a timing when the user can order the limited product in the store A. That is, at a timing immediately before the user displays the purchase menu of the store A, the information terminal 100 of the user detects a beacon signal corresponding to the store A. Then, the information terminal 100 transmits the store ID of the store A and the menu request in association with each other to the management server 200. Thus, the information terminal 100 receives privileged purchase menu information, and displays the privileged purchase menu G7 on the display 105. This processing corresponds to steps S6, S8, and S9 in FIG. 6.

Unlike in the standard purchase menu G3 illustrated in FIG. 9, a limited product field 70 indicating the current limited product of the store A is arranged in an upper part of the privileged purchase menu G7. Thus, it is possible to appeal the presence of the limited product to the user in an easy-to-understand manner.

The width of the limited product field 70 is approximately twice the width of the tile object 30. A tile object 30 indicating the limited product is arranged in the limited product field 70. Here, since a cappuccino is generated as the limited product, the tile object 30 indicating a cappuccino is arranged in the limited product field 70. In the tile object 30, in addition to the product name and the price, a message (last one! 50 yen off) indicating the stock quantity and the discount amount is displayed. Thus, the user can understand that there is only one limited product left and the limited product can be purchased at a price of 50 yen lower than the normal price. Although the discount amount is displayed here, a discount rate (for example, 20% OFF) or the like may be displayed.

A message stating "special offer only from store A" is further displayed in the limited product field 70. This message can make the user recognize that the cappuccino is the limited product of the store A.

On the privileged purchase menu G7, the standard purchase menu is displayed below the limited product field 70. In the standard purchase menu, as in the standard purchase menu G3 illustrated in FIG. 9, the tile objects 30 are arranged according to the priority order of the products.

As in the standard purchase menu G3, the privileged purchase menu G7 is configured to be scrollable. Therefore, by performing a scroll operation, the user can cause tile objects 30 that have not been displayed on the initial screen of the privileged purchase menu G7 to be displayed, and can order a low-priority product.

When there are a plurality of limited products, a plurality of limited product fields 70 are displayed on the privileged purchase menu G7. In this case, the information terminal 100 may display the plurality of limited product fields 70 in order from the top on the privileged purchase menu G7.

Note that the present disclosure is not limited to this, and even when there are a plurality of limited products, the plurality of limited products may be displayed in the limited product field 70 by changing (enlarging) the size of the limited product field 70.

The privileged purchase menu information transmitted from the management server 200 includes layout information indicating display positions of the limited product field 70, the tile objects 30, and the like, information for specifying the limited product, the priority order of the products, image data of the tile objects 30 corresponding to the products, and the like. Therefore, the information terminal 100 may draw the privileged purchase menu G7 on the display 105 by arranging the limited product field 70 and the tile objects 30 in accordance with the layout information.

When the user touches one of the tile objects 30 with the indicator 1000 on the privileged purchase menu G7, the information terminal 100 superimposes and displays the order field 41 in a lower part of the privileged purchase menu G7. Here, since the tile object 30 of the cappuccino, which is the limited product, is touched, the number of ordered cappuccinos, the price, and the order button 42 are displayed in the order field 41.

Having completed the order operation, the user touches the order button 42. Upon the order button 42 being touched, the information terminal 100 transmits order information including the type and the number of ordered products to the management server 200. Thus, the order is received. This processing corresponds to step S10 in FIG. 6.

Figure 14:
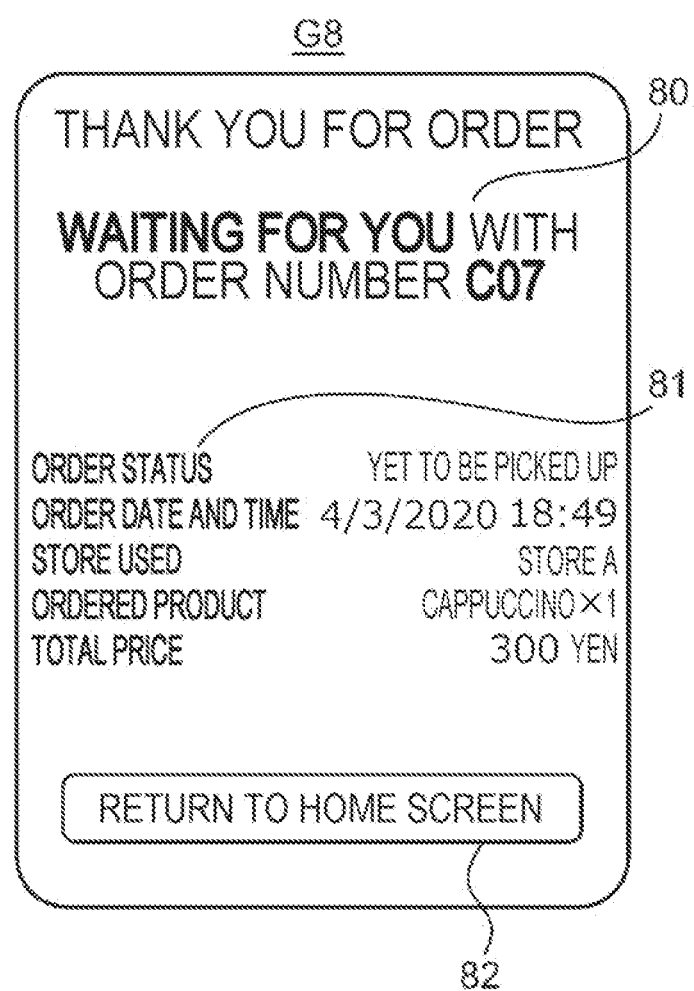
FIG. 14 is a diagram illustrating an order confirmation screen displayed on an information terminal.
Figure 15:
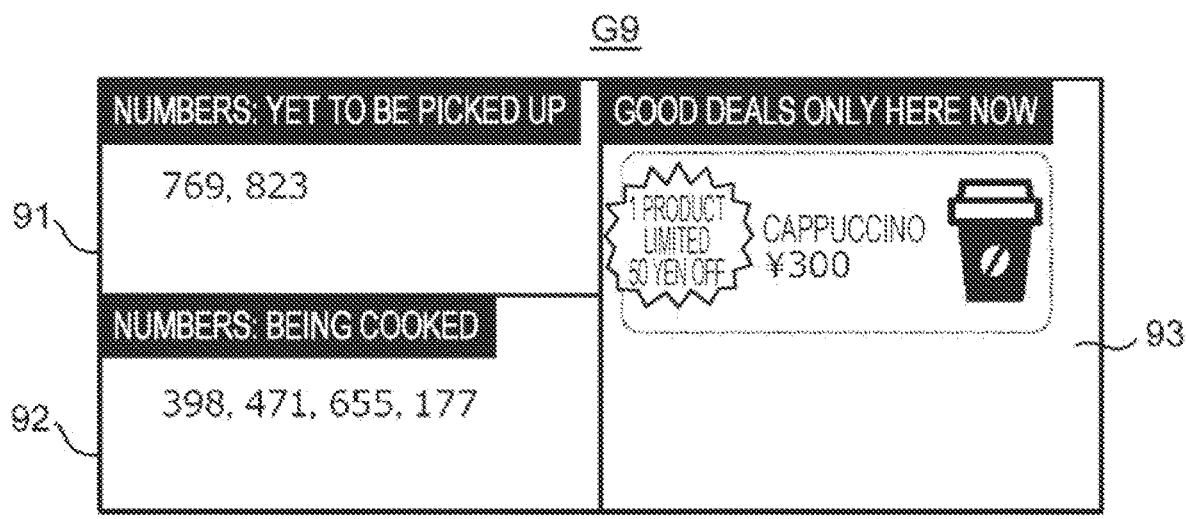
FIG. 15 is a diagram illustrating an example of an order status screen displayed on a display device.
Figure 16:
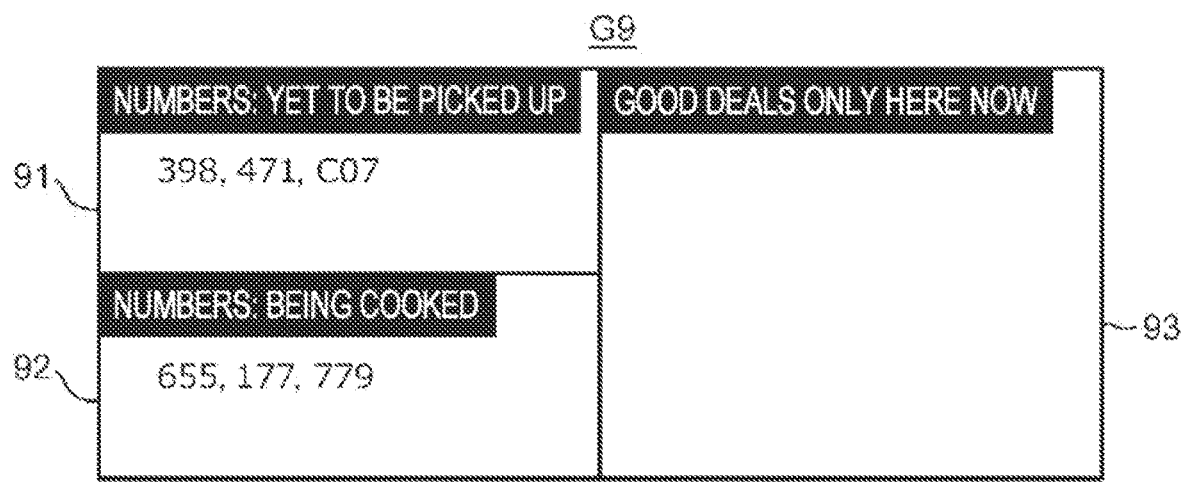
FIG. 16 is a diagram illustrating an example of the order status screen displayed on the display device.

FIG. 14 is a diagram illustrating an order confirmation screen G8 displayed on the information terminal 100. FIG. 15 and FIG. 16 are diagrams illustrating examples of an order status screen G9 displayed on the display device 320.

Upon the order button 42 being touched on the privileged purchase menu G7, the information terminal 100 displays the order confirmation screen G8. An order number field 80 for displaying the order number (order ID), an order content field 81, and a return button 82 are displayed on the order confirmation screen G8.

The order ID is displayed in the order number field 80. The order ID is issued by the store terminal 310 of the store A that has received the order, and is an identifier for identifying the order.

The order status, the order date and time, the store used, the ordered product, and the total price are displayed in the order content field 81. Details of these are the same as those in the order content field 60. The return button 82 is a button for returning to the initial screen G1 (home screen).

The order status screen G9 is a screen for notifying the order status to users who visit the store A. The order status screen G9 in FIG. 15 illustrates a case where there is a limited product, whereas the order status screen G9 in FIG. 16 illustrates a case where there is no limited product.

Display fields 91, 92, and 93 are displayed on the order status screen G9. The display field 91 is a field for displaying order IDs of products that have been cooked and are ready to be picked up by users. The display field 92 is a field for displaying order IDs of products that are being cooked. The display field 93 is a field for displaying limited product information. Here, since a cappuccino is generated as the limited product, limited product information about the cappuccino is displayed in the display field 93. Specifically, the product name, price, image, and discount amount of the cappuccino are displayed in the display field 93. Thus, users who visit the store A can check the limited product. A user who desires to order the limited product starts the business operator X application, selects the store A from the map screen G2, causes the display 105 to display the privileged purchase menu G7, and orders the cappuccino. Alternatively, instead of using the business operator X application, the user may tell an employee at a store counter that they desire to purchase the cappuccino. Note that the processing of displaying the order status screen G9 in FIG. 15 corresponds to step S4' in FIG. 6. Upon completion of the order for the cappuccino, the order confirmation screen G8 is displayed on the display 105.

In this case, since the order for the limited product has been received, the order ID "C07" for the limited product is added to the display field 91 of the order status screen G9 in FIG. 16. Since the stock quantity of the limited product becomes zero by this order, the limited product information is deleted from the display field 93 of the order status screen G9 in FIG. 16.

Figure 17:
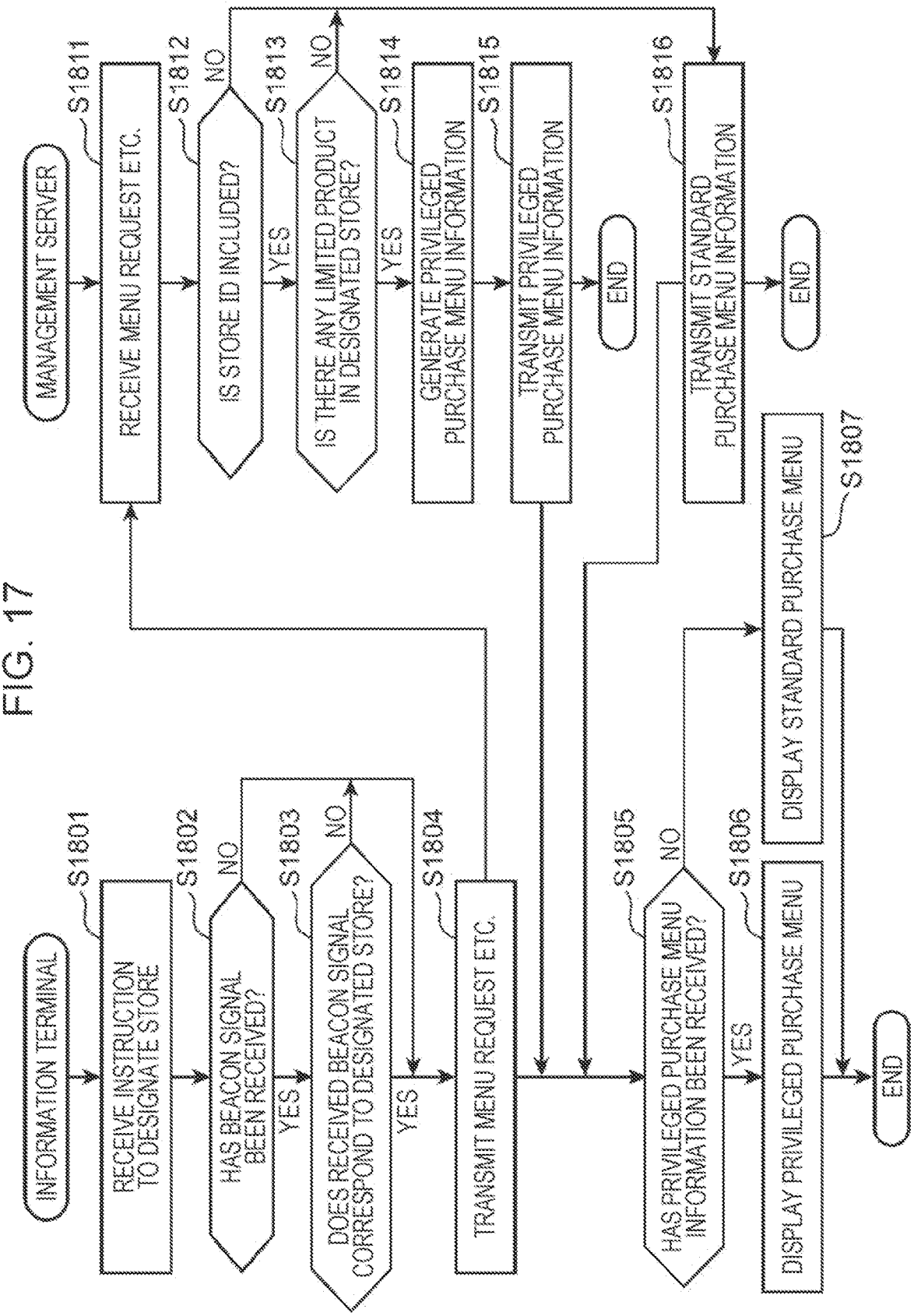
FIG. 17 is a flowchart illustrating details of the process performed by the information providing system according to the first embodiment.

Next, the process performed by the information providing system according to the first embodiment will be described in detail. FIG. 17 is a flowchart illustrating details of the process performed by the information providing system according to the first embodiment.

First, the operation unit 106 of the information terminal 100 receives an instruction from a user to designate a store at which the user picks up a product (step S1801). This processing corresponds to step S5 in FIG. 6. Here, it is assumed that the store A is selected by the user.

Subsequently, the calculation unit 104 of the information terminal 100 determines whether the short-range communication unit 103 has successfully received a beacon signal (step S1802). If the reception of the beacon signal has been failed (NO in step S1802), the process proceeds to step S1804. If the beacon signal has been successfully received (YES in step S1802), the process proceeds to step S1803.

In step S1803, the calculation unit 104 of the information terminal 100 determines whether the received beacon signal is a beacon signal corresponding to the store A designated in step S1801. In this case, the calculation unit 104 specifies the store ID corresponding to the device ID included in the received beacon signal by referring to the store dictionary, and determines whether the specified store ID matches the store ID of the store A. If they match, the calculation unit 104 determines YES in step S1803. If they do not match, the calculation unit 104 determines NO in step S1803.

Subsequently, the calculation unit 104 of the information terminal 100 transmits a menu request and the like to the management server 200 via the communication unit 101. Here, if YES is determined in step S1803, the calculation unit 104 transmits the store ID of the store A and the menu request to the management server 200 via the communication unit 101. This processing corresponds to step S6 in FIG. 6. On the other hand, if NO is determined in step S1802 or S1803, the calculation unit 104 transmits the menu request to the management server 200 via the communication unit 101.

In step S1811, the communication unit 201 of the management server 200 receives the menu request and the like.

Subsequently, the calculation unit 202 of the management server 200 determines whether the store ID is included in the menu request and the like received in step S1811 (step S1812). If the store ID is included (YES in step S1812), the process proceeds to step S1813. If the store ID is included or if a preset invalid store ID is included (NO in step S1812), the process proceeds to step S1816.

In step S1813, the calculation unit 202 determines whether there is any limited product in the store (store A) designated in step S1801. Here, if limited product information is registered in the product database of the store A stored in the memory 203, the calculation unit 202 may determine that there is a limited product in the store A. If limited product information is not registered in the product database of the store A, the calculation unit 202 may determine that there is no limited product in the store A.

If it is determined in step S1813 that there is a limited product in the store A (YES in step S1813), the process proceeds to step S1814. If it is determined in step S1813 that there is no limited product in the store A (NO in step S1813), the process proceeds to step S1816.

In step S1814, the calculation unit 202 generates privileged purchase menu information in which the limited product indicated by the limited product information is added to standard purchase menu information of the store A.

Subsequently, the calculation unit 202 transmits identification information indicating that the information is the privileged purchase menu information, and the privileged purchase menu information of the store A to the information terminal 100 via the communication unit 201 (step S1815). In step S1816, the calculation unit 202 transmits the standard purchase menu information corresponding to the store designated in step S1801 to the information terminal 100 via the communication unit 201.

In step S1805, the calculation unit 104 of the information terminal 100 determines whether the privileged purchase menu information has been received. If the privileged purchase menu information has been received (YES in step S1805), the calculation unit 104 displays the privileged purchase menu on the display 105 (step S1806). On the other hand, if the standard purchase menu information has been received (NO in step S1805), the calculation unit 104 displays the standard purchase menu on the display 105 (step S1807).

If the management server 200 not only transmits the purchase menu information but also determines and transmits the display design thereof to the information terminal 100, the information terminal 100 may display the purchase menu on the display 105 in accordance with the display design of the purchase menu information received from the management server 200. In this case, the privileged purchase menu information transmitted in step S1815 or the standard purchase menu information transmitted in step S1816 may be directly displayed on the display 105 of the information terminal 100 in accordance with the designated design without performing the determination in step S1805. This can be easily realized by using Hypertext Markup Language (HTML), for example.

As described above, according to this embodiment, the limited product information indicating the limited product for which the time available for sale is limited is acquired, and the privileged purchase menu including the limited product is displayed to a person who is within the reception range of the beacon signal from the store. Thus, it is possible to timely provide information about the limited product, which changes from moment to moment depending on stock or time, to a person in the store or in the vicinity of the store through the information terminal 100. As a result, food waste can be reduced.

Furthermore, according to this embodiment, the purchase menu information is generated in response to the menu request corresponding to the store from the user and is output to the information terminal 100. Therefore, the purchase menu is prevented from being displayed on the information terminal 100 against the will of the user, and the user can be prevented from being bothered.

Second Embodiment

Next, a second embodiment will be described. In the second embodiment, the management server 200 generates privileged purchase menu information in advance, and transmits the privileged purchase menu information generated in advance to the information terminal 100 in response to reception of a menu request and the like. In this embodiment, the same components as those in the first embodiment are denoted by the same reference numerals, and description thereof will be omitted. Also, block diagrams and screen diagrams in this embodiment are the same as those in the first embodiment.

Figure 18:
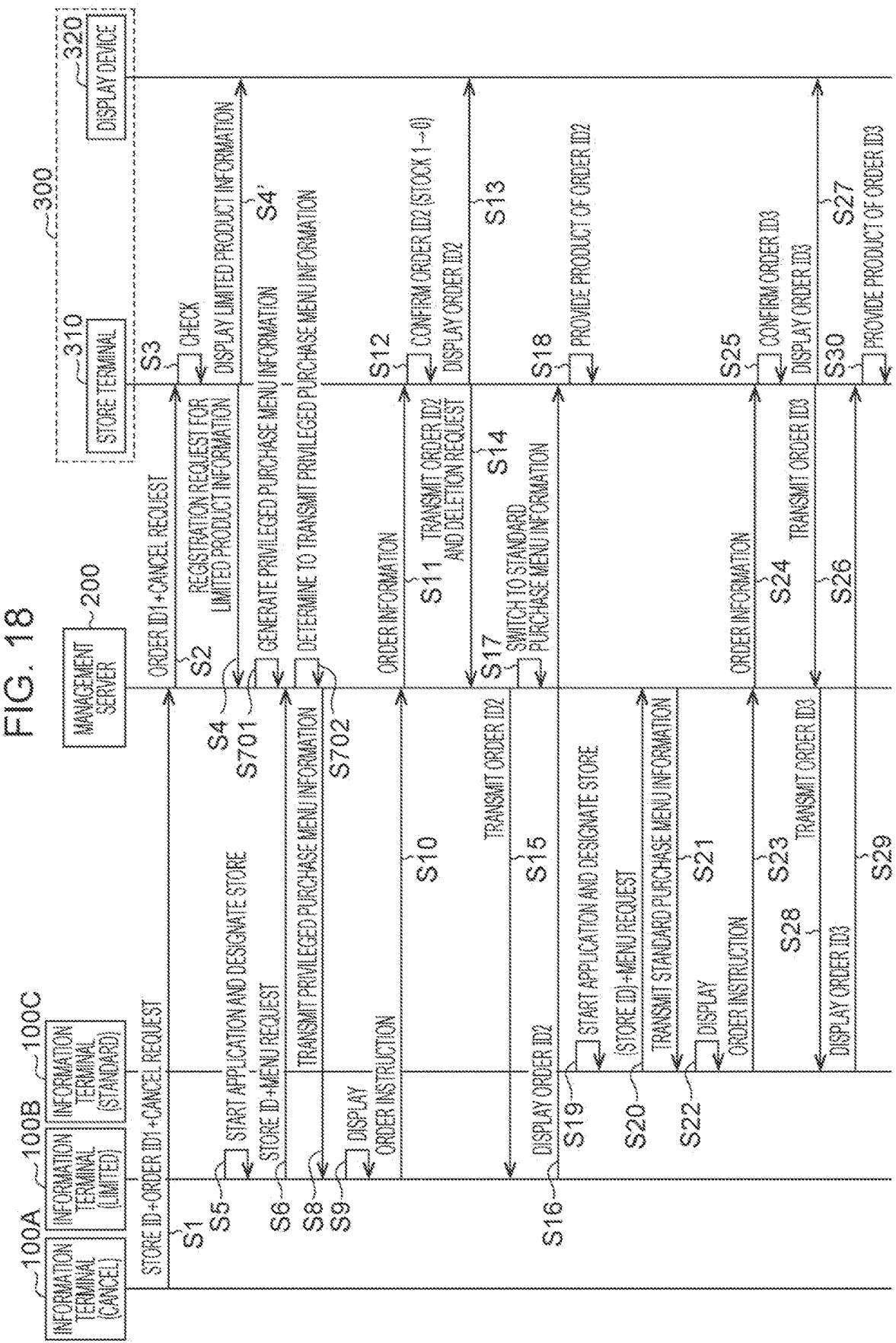
FIG. 18 is a sequence diagram illustrating an example of a process performed by an information providing system according to a second embodiment.

FIG. 18 is a sequence diagram illustrating an example of a process performed by an information providing system according to the second embodiment. In FIG. 18, the same processing as that in FIG. 6 is denoted by the same step number, and description thereof will be omitted.

In step S701, having received the registration request for the limited product information, the management server 200 generates privileged purchase menu information based on the limited product information. This generation is different from that in FIG. 6 in that being triggered by the registration request for the limited product information, not the reception of the menu request and the like.

Subsequently, having received the store ID and the menu request, the management server 200 determines to transmit the privileged purchase menu information (step S702). That is, upon reception of the menu request and the like, the management server 200 transmits the privileged purchase menu information that is generated in advance to the information terminal 100B. In FIG. 18, the processing other than steps S701 and S702 is the same as that in FIG. 6.

As described above, according to the second embodiment, since it is not necessary to generate the privileged purchase menu information each time the menu request and the like are received, it is possible to reduce the processing load of the management server 200.

Third Embodiment

Next, a third embodiment will be described. The information terminal 100 transmits a request for the privileged purchase menu or a request for the standard purchase menu to the management server 200. In this embodiment, the same components as those in the first and second embodiments are denoted by the same reference numerals, and description thereof will be omitted. Also, block diagrams and screen diagrams in this embodiment are the same as those in the first embodiment.

FIG. 2 is to be referred to. In this embodiment, in the information terminal 100, the operation unit 106 receives an instruction from a user to designate a store (an example of a first branch store) at which the user desires to pick up a product.

In the information terminal 100, the calculation unit 104 determines whether the store ID corresponding to the device ID included in the beacon signal received by the short-range communication unit 103 matches the store ID of the store designated by the user. If it is determined that the store ID corresponding to the device ID included in the beacon signal received by the short-range communication unit 103 matches the store ID of the store designated by the user, the calculation unit 104 transmits a request for a privileged purchase menu for acquiring privileged purchase menu information to the management server 200 via the communication unit 101. Here, the request for the privileged purchase menu includes the store ID that is determined to match. On the other hand, if it is determined that the store ID corresponding to the device ID included in the beacon signal received by the short-range communication unit 103 does not match the store ID of the store designated by the user, the calculation unit 104 transmits a request for a standard purchase menu for acquiring standard purchase menu information to the management server 200 via the communication unit 101.

Here, the calculation unit 104 refers to the store dictionary stored in the memory 102 and determines whether the store ID corresponding to the device ID included in the beacon signal matches the store ID of the store designated by the user.

In the management server 200, upon reception of the request for the privileged purchase menu via the communication unit 201, the calculation unit 202 transmits the privileged purchase menu information of the store corresponding to the store ID included in the request for the privileged purchase menu to the information terminal 100 via the communication unit 201. On the other hand, upon reception of the request for the standard purchase menu via the communication unit 201, the calculation unit 202 transmits the standard purchase menu information to the information terminal 100 via the communication unit 201.

FIG. 19 is a sequence diagram illustrating an example of a process performed by an information providing system according to the third embodiment. FIG. 19 is based on FIG. 18, and the same processing as that in FIG. 18 is denoted by the same reference numeral, and description thereof will be omitted. Therefore, in this embodiment, it is assumed that the management server 200 generates the privileged purchase menu information in advance, triggered by the reception of the limited product information. It is also assumed that the store designated in steps S5 and S19 is the store A. However, this is an example, and the management server 200 may generate the privileged purchase menu information triggered by the reception of the request for the privileged purchase menu.

In step S801, the information terminal 100 transmits a request for the privileged purchase menu or a request for the standard purchase menu. If a beacon signal including the device ID corresponding to the store ID of the store A designated in step S5 has been successfully received, the information terminal 100 transmits the request for the privileged purchase menu and the store ID of the store A. On the other hand, if the reception of the beacon signal including the device ID corresponding to the store ID of the store A designated in step S5 has been failed, or if the reception of any beacon signal has been failed, the information terminal 100 transmits the request for the standard purchase menu to the management server 200. The standard purchase menu information transmitted here is of a purchase menu that is common to all stores in the affiliated stores of the business operator X.

Subsequently, the management server 200 transmits the privileged purchase menu information of the store A or the standard purchase menu information of the store A to the information terminal 100 (step S802). Here, if the request for the privileged purchase menu including the store ID of the store A has been received, the management server 200 transmits the privileged purchase menu information of the store A to the information terminal 100. On the other hand, if the request for the standard purchase menu has been received, the management server 200 transmits the standard purchase menu information to the information terminal 100. The request for the privileged purchase menu is an example of a request for a standard purchase menu of affiliated stores transmitted together with a first branch store ID. The request for the standard purchase menu is an example of a request for a standard purchase menu.

The subsequent processing in steps S9 to S19 is the same as that in FIG. 18. In step S803, as in step S801, the information terminal 100C transmits a request for the privileged purchase menu and the store ID of the store A, or a request for the standard purchase menu, to the management server 200. In step S804, since the limited product is sold out, the management server 200 transmits the standard purchase menu information to the information terminal 100C. The subsequent processing in steps S22 to S30 is the same as that in FIG. 18.

The following use cases can be assumed in this embodiment. For example, the store A is present at the nearest station of a user's home, and a store B, which is an affiliated store of the store A, is present at the nearest station of the user's work place. A limited product is a freshly cooked but canceled product as described above, and its taste is degraded due to cooling or the like as time passes. Therefore, if the user near the store B far away from home on the way home from the work place orders the limited product of the store A, the taste of the limited product may be degraded when the limited product is picked up at the store A.

Therefore, in this embodiment, if the user starts the business operator X application near the store B on the way home from the work place and designates the store A, the information terminal 100 displays the standard purchase menu common to the affiliated stores instead of the privileged purchase menu. Thus, if the user is near the store B far away from home, the user is unable to order the limited product of the store A, and can be prevented from picking up the limited product with degraded taste at the store A.

On the other hand, if the user starts the business operator X application near the store A on the way home and designates the store A, the information terminal 100 displays the privileged purchase menu. Thus, the user is notified of the limited product of the store A, and is able to pick up the limited product whose taste is not degraded at the store A. Thus, the user can take home and eat the limited product immediately after picking up the limited product, and can eat the limited product deliciously.

In the third embodiment, the beacon signal includes the device ID corresponding to the store. However, the present disclosure is not limited to this, and the beacon signal may include a store ID (an example of a first branch store ID or a second branch store ID). In this case, the information terminal 100 may determine whether the store ID of the store designated by the user matches the store ID included in the beacon signal. If it is determined that the store ID of the store designated by the user matches the store ID included in the beacon signal, the information terminal 100 may transmit a request for the privileged purchase menu to the management server 200. On the other hand, if it is determined that the store ID of the store designated by the user does not match the store ID included in the beacon signal, the information terminal 100 may transmit a request for the standard purchase menu to the management server 200.

According to the present disclosure, it is possible to provide an information providing method useful in fast-food businesses, ready-made meal businesses, and the like.

What is claimed is:

1. A method to be executed in a communication terminal that communicates with a store management system connected to a first store terminal corresponding to a first branch store in affiliated stores and a second store terminal corresponding to a second branch store in the affiliated stores, the method comprising:
    receiving, from a user of the communication terminal, a selection of the first branch store from at least one branch store displayed on a display of the communication terminal using an input device of the communication terminal by the user;
    receiving one beacon signal including one branch store ID from either a first beacon signal transmitter disposed in the first branch store by using short-range wireless communication or a second beacon signal transmitter disposed in the second branch store by using short-range wireless communication when the communication terminal is within a reception range of the one beacon signal, the one beacon signal including a first branch store ID, as the one branch store ID, indicating the first branch store when the one beacon signal is transmitted from the first beacon signal transmitter, the one beacon signal including a second branch store ID, as the one branch store ID, indicating the second branch store when the one beacon signal is transmitted from the second beacon signal transmitter;
    determining whether a selected first branch store ID corresponding to the selected first branch store matches the one branch store ID included in the received one beacon signal,
    transmitting, to the store management system by using wireless communication to connect to a wide area communication network, the selected first branch store ID together with a request for a standard purchase menu of the affiliated stores, in response to determining that the selected first branch store ID corresponding to the selected first branch store matches the one branch store ID included in the received one beacon signal; and
    receiving, in response to transmitting the selected first branch store ID together with the request for the standard purchase menu of the affiliated stores, from the store management system by using wireless communication to connect to the wide area network, privileged purchase menu information corresponding to the first branch store in which limited product information indicating a limited product for which a time available for sale in the first branch store is limited is added to the standard purchase menu, wherein the limited product information is registered in a database of the store management system in response to an acquisition of the limited product information by the store management system from the first store terminal, and the limited product is specified by the limited product information registered in the database of the store management system.

2. The method according to claim 1, further comprising:
    transmitting, to the store management system by using wireless communication to connect to the wide area network, the request for the standard purchase menu of the affiliated stores without the selected first branch store ID and without the one branch store ID, in response to determining that the selected first branch store ID corresponding to the selected first branch store does not match the one branch store ID included in the one beacon signal; and
    receiving, in response to transmitting the request for the standard purchase menu of the affiliated stores without the selected first branch store ID and without the one branch store ID, from the store management system by using wireless communication to connect to the wide area network, standard purchase menu information of the affiliated stores.

3. A communication terminal that executes the control method according to claim 1.

4. A non-transitory recording medium storing a program for causing a computer of the communication terminal to execute the control method according to claim 1.

5. The method according to claim 1, further comprising:
    transmitting, to the store management system by using wireless communication to connect to the wide area network, a preset invalid store ID together with the request for the standard purchase menu of the affiliated stores, in response to determining that the selected first branch store ID corresponding to the selected first branch store does not match the one branch store ID included in the one beacon signal; and
    receiving, from the store management system by using wireless communication to connect to the wide area network, standard purchase menu information of the affiliated stores, in response to transmitting the preset invalid store ID together with the request for the standard purchase menu of the affiliated stores.

\* \* \* \* \*